(12) United States Patent
Amanat et al.

(10) Patent No.: US 6,532,460 B1
(45) Date of Patent: Mar. 11, 2003

(54) METHOD AND APPARATUS FOR AUTOMATED CANCELLATION OF ORDERS FOR SECURITIES

(76) Inventors: Irfan Amanat, 200 E. 94$^{th}$ St., Apt. 1712, New York, NY (US) 10128; Michael Bundy, 22422 Cove Hollow, Katy, TX (US) 77450

( * ) Notice: Subject to any disclaimer, the term of this patent is extended or adjusted under 35 U.S.C. 154(b) by 267 days.

(21) Appl. No.: 09/619,223

(22) Filed: Jul. 19, 2000

(51) Int. Cl.$^7$ .......................... G06F 17/30; G06F 17/60
(52) U.S. Cl. ................. 707/3; 705/37; 705/36
(58) Field of Search ................ 707/3, 7, 9, 10; 705/36, 37, 30

(56) References Cited

U.S. PATENT DOCUMENTS

| | | | |
|---|---|---|---|
| 3,573,747 A | 4/1971 | Adams et al. | 705/37 |
| 3,581,072 A | 5/1971 | Nymeyer | 705/37 |
| 3,976,840 A | 8/1976 | Cleveland et al. | 379/93.02 |
| 4,243,844 A | 1/1981 | Waldman | 379/442 |
| 4,412,287 A | 10/1983 | Braddock, III | 705/37 |
| RE31,643 E | 8/1984 | Waldman | 379/352 |
| 4,585,130 A | 4/1986 | Brennan | 211/190 |
| 4,588,192 A | 5/1986 | Laborde | 273/240 |
| 4,674,044 A | 6/1987 | Kalmus et al. | 705/37 |
| 4,677,552 A | 6/1987 | Sibley, Jr. | 705/37 |
| 4,750,135 A | 6/1988 | Boilen | 709/231 |
| 4,751,640 A | 6/1988 | Lucas et al. | 705/36 |
| 4,903,201 A | 2/1990 | Wagner | 705/37 |
| 4,949,248 A | 8/1990 | Caro | 709/203 |
| 5,025,372 A | 6/1991 | Burton et al. | 705/14 |
| 5,038,284 A | 8/1991 | Kramer | 705/37 |
| 5,101,353 A | 3/1992 | Lupien et al. | 705/37 |
| 5,136,501 A | 8/1992 | Silverman et al. | 705/37 |
| 5,168,446 A | 12/1992 | Wiseman | 705/37 |
| 5,267,148 A | 11/1993 | Kosaka et al. | 705/37 |
| 5,270,922 A | 12/1993 | Higgins | 705/37 |
| 5,297,031 A | 3/1994 | Gutterman et al. | 705/37 |
| 5,297,032 A | 3/1994 | Trojan et al. | 705/37 |
| 5,339,392 A | 8/1994 | Risberg et al. | 345/762 |
| 5,361,199 A | 11/1994 | Shoquist et al. | 705/26 |
| 5,375,055 A | 12/1994 | Togher et al. | 705/37 |
| 5,500,889 A | 3/1996 | Baker et al. | 379/112.04 |
| 5,508,913 A | 4/1996 | Yamamoto et al. | 705/37 |
| 5,517,406 A | 5/1996 | Harris et al. | 705/30 |
| 5,557,517 A | 9/1996 | Daughtery, III | 705/37 |
| 5,563,783 A | 10/1996 | Stolfo et al. | 705/8 |
| 5,640,569 A | 6/1997 | Miller et al. | 710/241 |

(List continued on next page.)

*Primary Examiner*—Sanjiv Shah
(74) *Attorney, Agent, or Firm*—Gordon T. Arnold; Arnold & Associates

(57) ABSTRACT

Methods and systems for administering redundant cancellations of orders for securities. Canceling orders for securities in an automated securities trading broker-dealer system. Receiving new cancellations from clients and searching a cancellation queue for cancellations corresponding to the new cancellations. If a corresponding cancellation is found in the cancellation queue, the redundancy count of the corresponding cancellation is incremented in the cancellation queue and the new cancellation is discarded. If a cancellation corresponding to the new cancellation is not found in the cancellation queue, a copy of the new cancellation is placed in the cancellation queue and the new cancellation is sent to the market. Embodiments periodically scanning the cancellation queue for cancellations having a redundancy count greater than zero, decrementing the redundancy count for such cancellations. Some embodiments issue additional cancellations dependent upon receipt of acknowledgments of earlier cancellations. Other embodiments issue additional cancellations dependent upon receipt of rejections of earlier cancellations. Other embodiments provide the capability of canceling orders for securities when an order corresponding to a cancellation is still in a market queue waiting to be sent to a market. Other embodiments include implementing Immediate or Cancel orders (IOC) for markets that do not support IOC orders.

82 Claims, 20 Drawing Sheets

U.S. PATENT DOCUMENTS

| | | | |
|---|---|---|---|
| 5,655,088 A | 8/1997 | Midorikawa et al. | 705/37 |
| 5,689,652 A | 11/1997 | Lupien et al. | 705/37 |
| 5,727,165 A | 3/1998 | Ordish et al. | 705/37 |
| 5,752,237 A | 5/1998 | Cherny | 705/4 |
| 5,774,880 A | 6/1998 | Ginsberg | 705/36 |
| 5,788,234 A | 8/1998 | Siofer | 273/256 |
| 5,799,287 A | 8/1998 | Dembo | 705/36 |
| 5,806,048 A | 9/1998 | Kiron et al. | 705/36 |
| 5,809,483 A | 9/1998 | Broka et al. | 705/37 |
| 5,819,237 A | 10/1998 | Garman | 705/36 |
| 5,819,238 A | 10/1998 | Fernholz | 705/36 |
| 5,845,266 A | 12/1998 | Lupien et al. | 705/37 |
| 5,852,808 A | 12/1998 | Cherny | 379/352 |
| 5,857,176 A | 1/1999 | Ginsberg | 705/36 |
| 5,875,108 A | 2/1999 | Hoffberg et al. | 700/17 |
| 5,901,246 A | 5/1999 | Hoffberg et al. | 382/209 |
| 5,905,974 A | 5/1999 | Fraser et al. | 705/37 |
| 5,924,083 A | 7/1999 | Silverman et al. | 705/37 |
| 5,940,810 A | 8/1999 | Traub et al. | 705/36 |
| 5,946,667 A | 8/1999 | Tull, Jr. et al. | 705/36 |
| 5,950,176 A | 9/1999 | Keiser et al. | 705/37 |
| 6,014,643 A * | 1/2000 | Minton | 705/26 |
| 6,029,146 A * | 2/2000 | Hawkins et al. | 235/379 |
| 6,195,647 B1 * | 2/2001 | Martyn et al. | 705/35 |
| 6,278,982 B1 * | 8/2001 | Korhammer et al. | 705/36 |
| 6,317,728 B1 * | 11/2001 | Kane | 705/36 |
| 6,408,282 B1 * | 6/2002 | Buist | 705/36 |
| 6,418,419 B1 * | 7/2002 | Nieboer et al. | 705/37 |

* cited by examiner

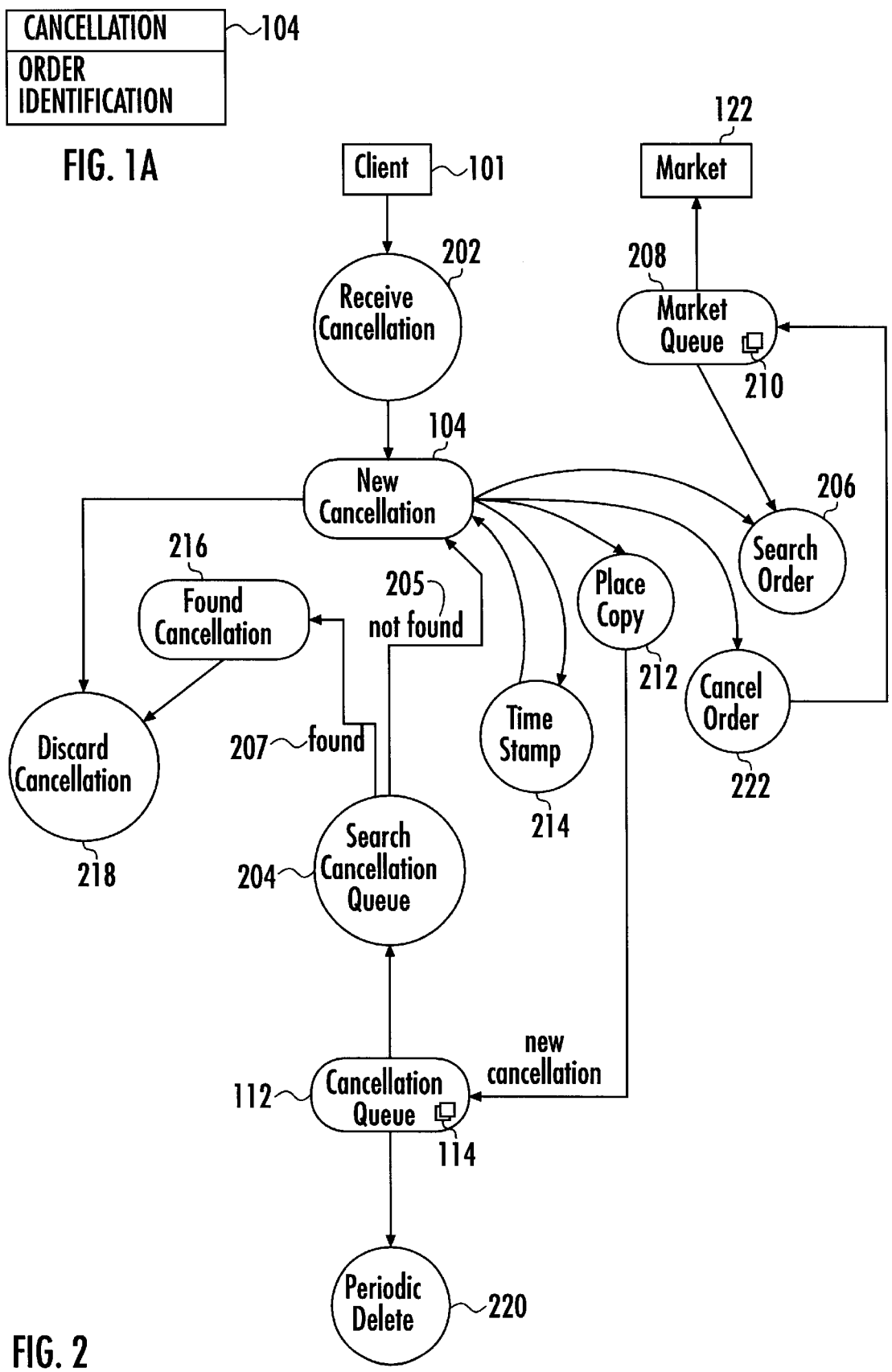

METHOD AND APPARATUS FOR AUTOMATED CANCELLATION OF ORDERS FOR SECURITIES

BACKGROUND

Speed of execution of orders for securities is an increasingly important element of overall quality of execution. Modern automated systems for order execution make available even to private investors a high quality of market information coupled with increasing speed of execution. More and more often, investors and traders equate quality of execution with speed, that is, with the ability to enter and order and have the order execute at or near the price they see on their computer screens.

Viewed according to their interest in speed as an element of quality execution, investors can be classified in three broad categories. First, there are traditional investors. Traditional investors trade approximately once a month. Traditional investors are interested in long term investment. Traditional investors may have relatively little concern with speed of execution because traditional investors, intending to hold the stock for months or years, may be perfectly happy with any price in the stock's daily trading range. The quality of market information available to traditional investors, however, is increasing dramatically. As the quality of information increases, even traditional investors are becoming more demanding of quality execution.

The second category of investors is hyperactive investors. Hyperactive investors are serious hobbyists or enthusiasts rather than professional investors. They do not earn their living exclusively from investing. They have other professions or occupations, but they are focally interested in the process of investing. Hyperactive investors trade approximately once daily, about twenty times more often than traditional investors. Hyperactive investors are often interested in popular stocks in which they may remain invested for relatively short periods of time, perhaps only a few days or hours. Hyperactive investors are well aware of advances in the quality of market information available, and hyperactive investors are well aware of the relationship between speed and quality of execution. Hyperactive investors increasingly therefore demand a high quality of execution including, especially, access to a currently displayed inside price, which access depends upon speed of execution.

The third category of investors is day traders. Day traders are full-time, individual, professional securities traders. Day traders generally may make thirty to fifty trades a day, perhaps fifty times as many trades as hyperactive investors and a thousand times as many as traditional investors. Day traders probably account for about fifteen percent of the trading volume on Nasdaq. For day traders, quality of execution is a matter of financial survival and is crucially important. A delay in execution of even a few seconds can cause a loss for a day trader because markets can change so quickly. Day traders cannot tolerate traditional aggregation, internalization, or payment for order flow. Day traders cannot tolerate many of the kinds of delay common in prior art. When a day trader enters an order, the order must be executed as quickly as possible, at or near the displayed quote price, regardless of delay between changes in actual quote price and the resulting display of market information. Day traders have no time to wait for redundant cancellations to work their way through communications channels.

Broker-dealers often make available to their customers on-line submission, cancellation, and tracking of the status of orders for securities. Securities trading customers include traditional investors, hyperactive investors, day traders, and institutions. Such customers make many quick decisions regarding when and from whom to order securities. All such customers are increasingly demanding regarding quality and speed of execution.

In modern automated systems for execution of orders for securities, it is common for customers to be provided with automated methods and systems for canceling orders. Customers can cancel the same order more than once. For some reasons, it is desirable for customers to be able to cancel the same order more than once, perhaps many times, all approximately at the same time. In such automated systems, orders are sent by broker-dealer systems to automated markets. The automated markets do not always reliably respond to cancellations by canceling the subject orders. Cancellations may be subject to faulty receipt, rejection or other failures to execute in their destination markets, for many technical reasons.

Regardless of the reasons, however, the fact is that sending one automated cancellation may not actually result in cancellation of the subject order. If the orders are not cancelled, the customer is left in possession of the market risk in a securities position that the customer has already decided to exit. In volatile markets, the risk of remaining in an undesirable position in the market can be large. It is common, therefore, for customers in possession of the automated tools to issue multiple redundant cancellations for the same order.

Multiple redundant cancellations for the same order can create a large burden on the data communications systems that connect broker-dealer systems to automated markets. Some automated broker-dealer systems make available to customers automated systems for canceling all their presently outstanding orders. Such a facility is useful, for example, as an automated way for a customer to alter the customer's entire market position. Such systems do, however, represent a substantial problem for the data communications systems they feed. A customer may have dozens or even hundreds of orders outstanding, and the customer may simply reach down to the customer's keyboard and press the <CANCEL ALL> button several times, resulting in hundreds or even thousands of cancellations, most of which are uselessly redundant. Such massive quantities of redundant cancellations can have a large negative impact on overall order execution speed, sometimes bringing broker-dealer systems almost to a halt.

If there is a small risk that sending one cancellation might be ineffective, that risk can be reduced by sending two. The risk could be further reduced by automated determination whether the first cancellation is actually received by the destination market. The risk could be further reduced by automated determination whether the first cancellation is actually executed by the destination market. Sending redundant cancellations for orders represents an unnecessary burden on data communications systems. Automated systems and methods therefore, are needed for better administration of redundant cancellations.

SUMMARY

The present invention provides methods and systems for administering redundant cancellations for orders for securities. The overall purpose of the invention is to improve the speed of automated execution of orders for securities by avoiding effects that slow automated systems for executing orders.

In a first aspect of the invention, a process is provided for canceling orders for securities in an automated securities trading broker-dealer system. This process provides the capabilities of receiving a new cancellation from a client and searching a cancellation queue for a cancellation corresponding to the new cancellation. If the corresponding cancellation is found in the cancellation queue, the redundancy count of the corresponding cancellation is incremented in the cancellation queue and the new cancellation is discarded. However, if a cancellation corresponding to the new cancellation is not found in the cancellation queue, a copy of the new cancellation is placed in the cancellation queue and the new cancellation is sent to the market. Additionally, this process provides the capability of periodically scanning the cancellation queue for cancellations having a redundancy count greater than zero. The redundancy count of each cancellation in the cancellation queue having a redundancy count greater than zero is decremented and an additional cancellation is sent to the market.

In another aspect of the invention, a system is provided for canceling orders for securities in an automated trading broker-dealer system. The system is implemented in hardware and software on automated computing machinery. The system comprises a processor coupled to at least one client system and at least one market system. The processor is programmed to receive a new cancellation and search a cancellation queue for a cancellation corresponding to the new cancellation. If a cancellation is found that corresponds to the new cancellation, the processor is programmed to increment the redundancy count of the corresponding cancellation in the cancellation queue and to discard the new cancellation. However, if a cancellation is not found that corresponds to the new cancellation, the processor is further programmed to place a copy of the new cancellation in the cancellation queue and send the new cancellation to the market. Additionally, the processor is programmed to periodically scan the entire cancellation queue for cancellations having a redundancy count greater than zero. If cancellations having a redundancy count greater than zero are found in the cancellation queue, the processor is further programmed to decrement the redundancy count of each queued cancellation having a redundancy count greater than zero and send an additional cancellation corresponding to the found cancellation to the market.

The system further comprises the processor coupled to memory for storage of cancellations received from the client, to a storage device for disaster recovery, and to communication ports for data transmission to and from the system.

The present invention encompasses various alternative process and system embodiments for canceling orders for securities in an automated trading broker-dealer system. These embodiments include canceling orders for securities wherein the order for the new cancellation received is still residing in the market queue waiting to be sent to the market. Other embodiments include canceling orders for securities based upon the reception of an acknowledgement or response to a cancellation previously sent to the market. Other embodiments include implementing Immediate or Cancel orders (IOC) for markets that do not support IOC orders.

DRAWINGS

FIG. 1A illustrates the structure of a cancellation.

FIG. 2 illustrates an alternative embodiment of a process for canceling orders for securities wherein the orders are residing in a market queue waiting to be sent to the market.

DETAILED DESCRIPTION OF EXEMPLARY EMBODIMENTS

Figure 1:
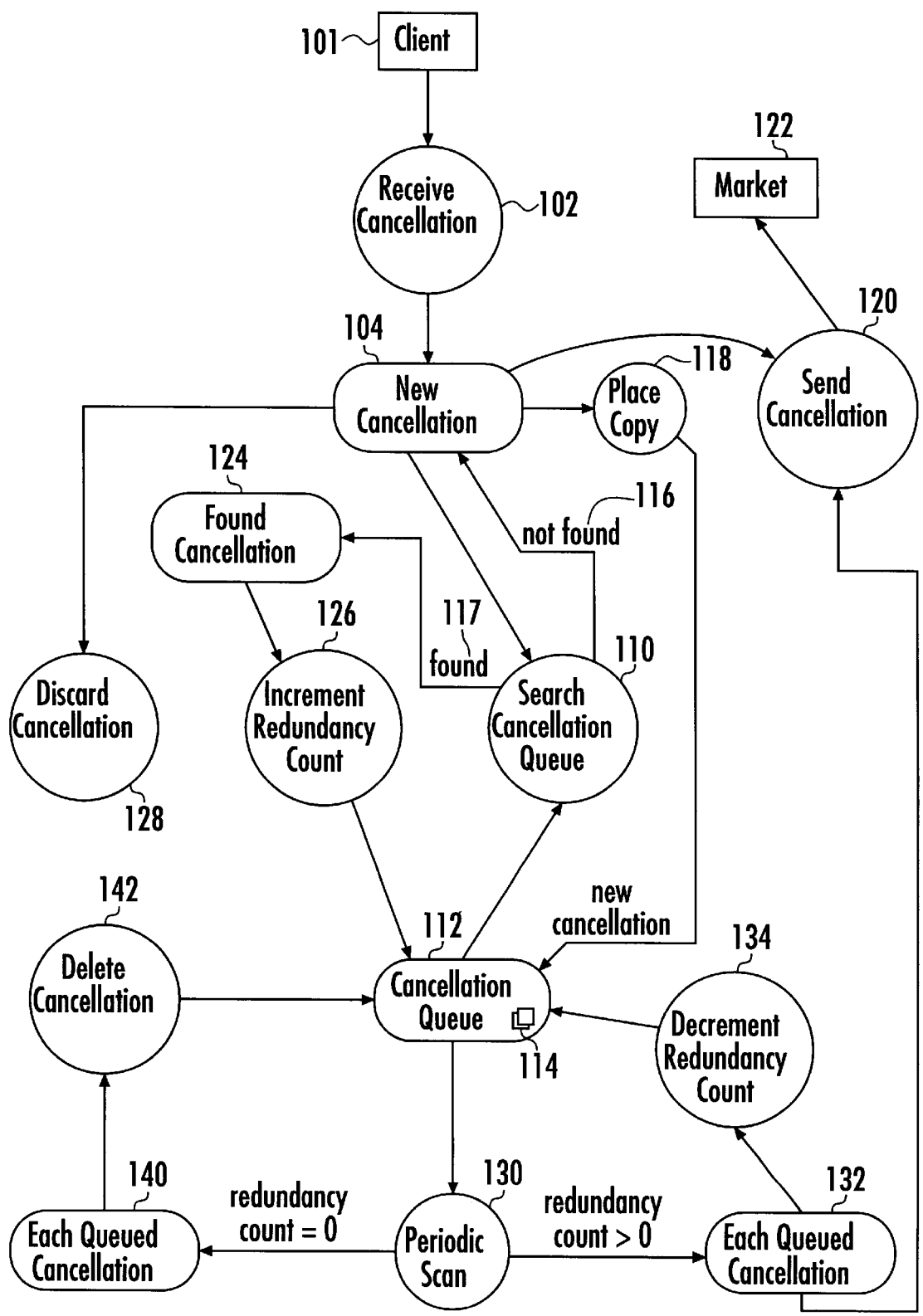
FIG. 1 illustrates a process for canceling orders for securities.

Definitions:

"Cancellation" is an instruction to terminate an order, or to partially terminate an order, issued by the customer or by software comprising embodiments of the invention. In addition, markets can cancel orders, or parts of orders, for example, in response to an IOC order, or for other reasons. An example of a data structure for cancellations, useful with many embodiments of the invention, is show in FIG. 1A. As shown in FIG. 1A, cancellations typically comprise an order identification relating the cancellation to the order sought to be cancelled.

"Client" refers to any entity capable of canceling an order for securities including trader terminals operated by customers. Clients in some embodiments will be computer systems located remotely from computers on which the broker-dealer systems, ECN's, or other market systems are installed and running. In some embodiments, client systems through their use of the invention in fact comprise elements of the invention. In some embodiments, clients are broker-dealer terminals or micro-computer systems located remotely from the broker-dealer computer; in such systems, cancellations are typically delivered from the client to the broker-dealer system by use of data communications means such as networks, dedicated communications lines, or satellite channels. In other embodiments clients are broker-dealer terminals installed and operating on the same computer system upon which is installed the broker-dealer system.

"ECN" abbreviates "Electronic Communications Network," referring to an order matching service that provides liquidity only by matching orders rather than by maintaining inventory. In the context of the invention, ECNs are considered markets. In order to avoid confusion with data communications networks, ECNs are referred to as either "ECNs" or as "markets." All ECNs have their own data communications protocols which must be followed by all systems submitting orders to ECNs. The ECNs' data communications protocols are public and well-known. Current ECNs, their symbols and names, are listed below. Obviously the number of ECNs can change at any time.

"Executed," in reference to an order, means that shares have been either bought or sold according to the side of the order.

"Exchange" means a national, regional, or international exchange for securities trading including for example, Nasdaq or NYSE.

"Filled" means fully executed. That is, all shares in the order have been executed, bought or sold according to the side of the order.

"IOC" abbreviates "Immediate or cancel," an order type description meaning that the market to which the order is directed is to fill the order immediately, with available price improvement, if any, or cancel it.

"IOC market" is a market supporting IOC orders, including price improvement for such orders. Examples of markets currently known to be IOC markets are Island, Archipelago, and Instinet. Of course the number and the identities of markets accepting IOC orders changes from time to time.

"IOC order" is an order designated as IOC, "Immediate Or Cancel," that is, to be filled immediately or cancelled. If price improvement is available in the market to which the order is directed, IOC orders are to receive such price improvement.

"Market," "electronic market," "market participant," "electronic market participant," "marketing network," and electronic marketing network" are all used as synonyms for services accessible through electronic communications networks capable of executing orders for securities by accepting from broker/dealers buy orders and sell orders, matching or failing to match buy orders with sell orders, and communicating the results to the broker/dealers. Generally the term "market" is used to refer to these entities. All "markets," as the term is used, are either ECNs or market makers. All available markets have names and symbols as described under the definitions of "ECN" and "market maker."

"Market maker" means a broker/dealer providing order matching and liquidity in a stock by maintaining an inventory of the stock traded through a national market. Currently active market makers, their symbols and names, are listed below. Obviously the number and identity of market makers can change at any time.

Figure 2A:
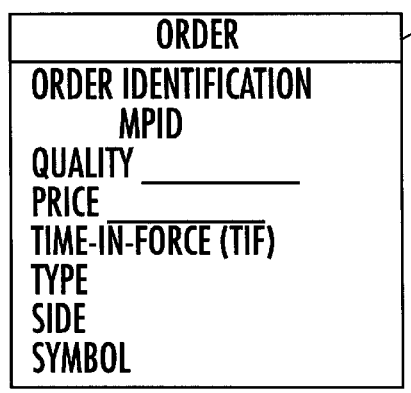
FIG. 2A illustrates the structure of an order.

"Orders" are electronic orders for purchase or sale of securities. An example of a data structure useful as an order in various embodiments of the invention is shown in FIG. 2A. As shown in FIG. 2A, orders typically comprise an order identification, a quantity identifying the quantity of securities to be bought or sold, a side identifying whether the order to sell or buy, and symbol identifying the securities to be bought or sold. Optionally, orders include also a market identification, a price, a time-in-force, and one or more type codes. The market identification is used in some embodiments to identify the market to which the order is directed. The market identification is often referred to as an "MPID," meaning "Market Participant Identification." The price set to zero encodes in many embodiments a market order, i.e., an order to buy or sell at the current inside price. The price set to an amount greater than zero indicates in many embodiments a limit order. A time-in-force (TIF) set to zero encodes an IOC order in many embodiments. Alternatively, some embodiments will support a type code that can be set to "IOC." And some embodiments support a type code indicating whether the order is a market order or a limit order.

"Rejection" refers to partial or complete termination of an order by a market or by action of the invention. "Rejection" contrasts with "cancel" in which an order is terminated by action of the customer. "Securities" are any agreement for investment. Stocks are the securities most often addressed in described embodiments of the invention. The invention, however, is applicable to many kinds of securities including, for example, options, commodities, and bonds.

Detailed Description:

Referring to FIG. 1, an aspect of the present invention, a process for canceling orders for securities in an automated securities trading broker-dealer system, is seen. The embodiment shown in FIG. 1 includes the steps of receiving (102) from client (101) a new cancellation (104) and searching (110) the cancellation queue (112) for a cancellation (114) having an order identification equal to the new cancellation's order identification. According to the illustrated embodiment, if a cancellation (114) having an order identification equal to the new cancellation's order identification is not found (116) by searching (110) the cancellation queue (112), a copy of the new cancellation (104) is placed (118) in the cancellation queue (112) and the new cancellation (104) is sent (120) to the market (122). However, in embodiments of this kind, if a cancellation (114) having an order identification equal to the new cancellation's order identification is found (117) by searching (110) the cancellation queue (112), the redundancy count of the found cancellation (124) is incremented (126) in the cancellation queue (112) and the new cancellation (104) is discarded (128).

The illustrated embodiment further includes the step of periodically scanning (130) the entire cancellation queue (112) for a queued cancellation (114) having a redundancy count greater than zero. In this kind of embodiment, for each queued cancellation having a redundancy count greater than zero (132), the redundancy count is decremented (134) and an additional cancellation (132) is sent (120) to the market (122).

According to another embodiment, the entire cancellation queue (112) is periodically scanned for queued cancellations (114) having a redundancy count equal to zero. In this kind of embodiment, for each queued cancellation having a redundancy count equal to zero (140), the queued cancellation (114) is deleted (142) from the cancellation queue (112).

Alternative embodiments time stamp the queued cancellations (114) and remove the cancellations (114) from the cancellation queue (112) dependent upon their age.

In a further embodiment of the present invention, shown in FIG. 1, the entire cancellation queue (112) is periodically scanned (130) every three seconds for queued cancellations (114) having a redundancy count greater than zero. In this kind of embodiment, for each queued cancellation having a redundancy count greater than zero (132), the redundancy count of the queued cancellation is decremented (134) every three seconds. In other embodiments, the cancellation queue (112) is scanned for intervals other than three seconds. All scanning intervals are within the scope of this invention.

Referring now to FIG. 2, an alternative embodiment of a process for canceling an order for securities in an automated securities trading system is illustrated. The illustrated embodiment includes the steps of receiving (202) a new cancellation (104) from client (101) and searching (206) the market queue (208) for an order (210) having an order identification equal to the new cancellation's order identification. In embodiments of this kind, if the order (210) is found in market queue (208) waiting to be sent to the market (122), the cancellation queue (112) is searched (204) for a cancellation (114) having an order identification equal to the new cancellation's order identification. In this embodiment, if a cancellation (114) having an order identification equal to the new cancellation's order identification is not found (205) in the cancellation queue (112), the embodiment further includes the steps of recording (214) on the new cancellation (104) the time when the new cancellation (104) was received, placing (212) a copy of the new cancellation (104) in the cancellation queue (112), and canceling (222) the order (210) in the market queue (208). However, in this kind of embodiment, if a queued cancellation (114) is found (207) having an order identification equal to the new cancellation's order identification, the new cancellation (104), which corresponds to found queued cancellation (216), is discarded (218). Alternative embodiments further comprise periodically deleting (220) queued cancellations (114) dependent upon their ages.

Figure 3:
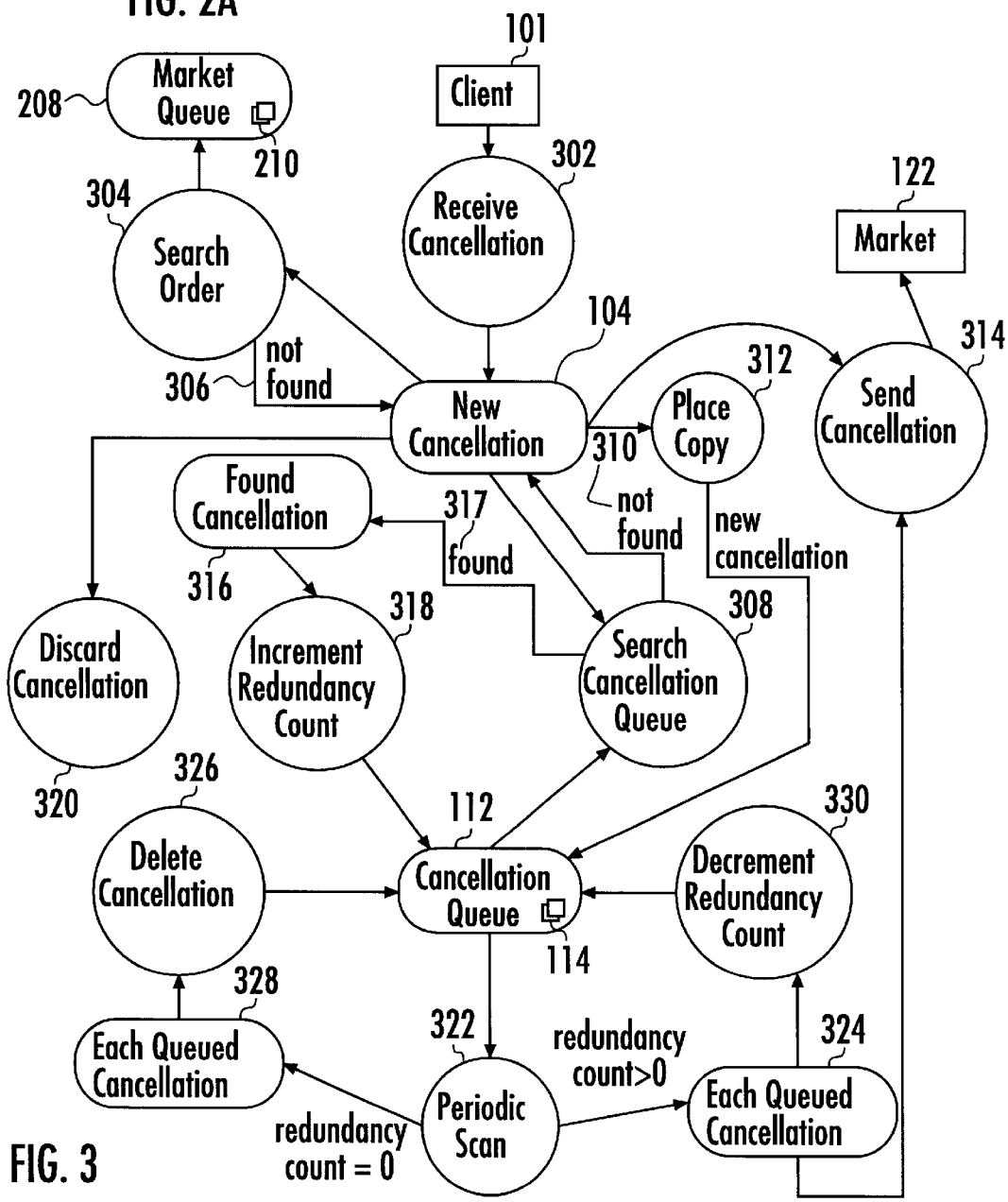
FIG. 3 illustrates an alternative embodiment of a process for canceling orders for securities wherein the orders are residing in a market queue waiting to be sent to the market.

Referring now to FIG. 3, an alternative embodiment of a process for canceling orders for securities in an automated securities trading broker-dealer system is illustrated. The embodiment includes the steps of receiving (302) from the client (101) a new cancellation (104) and searching (304) the market queue (208) for an order (210) having the same order identification as the new cancellation's (104) order identification. If an order having the same order identification as the new cancellation's (104) order identification is not found (306) in the market queue (208), the embodiment further includes the step of searching (308) the cancellation queue (112) for a cancellation (114) having an order identification equal to the new cancellation's order identification. According to the illustrated embodiment, if a cancellation having an order identification equal to the new cancellation's order identification is not found (310) by searching the cancellation queue (112), a copy of the new cancellation (104) is placed (118) in the cancellation queue (112) and the new cancellation (104) is sent (314) to the market (122). However, in embodiments of this kind, if a cancellation (114) having an order identification equal to the new cancellation's order identification is found (317) by searching (308) the cancellation queue (112), the redundancy count of the found cancellation (316) is incremented (318) in the cancellation queue (112) and the new cancellation (104) is discarded (320).

The illustrated embodiment, shown in FIG. 3, further includes the step of periodically scanning (322) the entire cancellation queue (112) for queued cancellations (114) having a redundancy count greater than zero. In embodiments of this kind, for each queued cancellation having a redundancy count greater than zero (324), the redundancy count of the queued cancellation (114) is decremented (330) and an additional cancellation (324) corresponding to the queued cancellation (114) is sent (314) to the market (122).

A further embodiment includes the step of periodically scanning (322) the entire cancellation queue (112) for queued cancellations (114) having a redundancy count greater equal to zero. In this kind of embodiment, for each queued cancellation having a redundancy count equal to zero (328), the queued cancellation (114) is deleted (326) from the cancellation queue (112). Alternative embodiments time stamp the queued cancellations (114) and remove the cancellations from the cancellation queue (112) dependent upon their age.

According to a further embodiment, shown in FIG. 3, the cancellation queue (112) is periodically scanned (322) every three seconds for queued cancellations (114) having a redundancy count greater than zero. In this embodiment, the redundancy count of each queued cancellation having a redundancy count greater than zero (324) is decremented every three seconds. In other embodiments, the cancellation queue (112) is scanned at intervals other than three seconds. All scanning intervals are within the scope of this invention.

Figure 4:
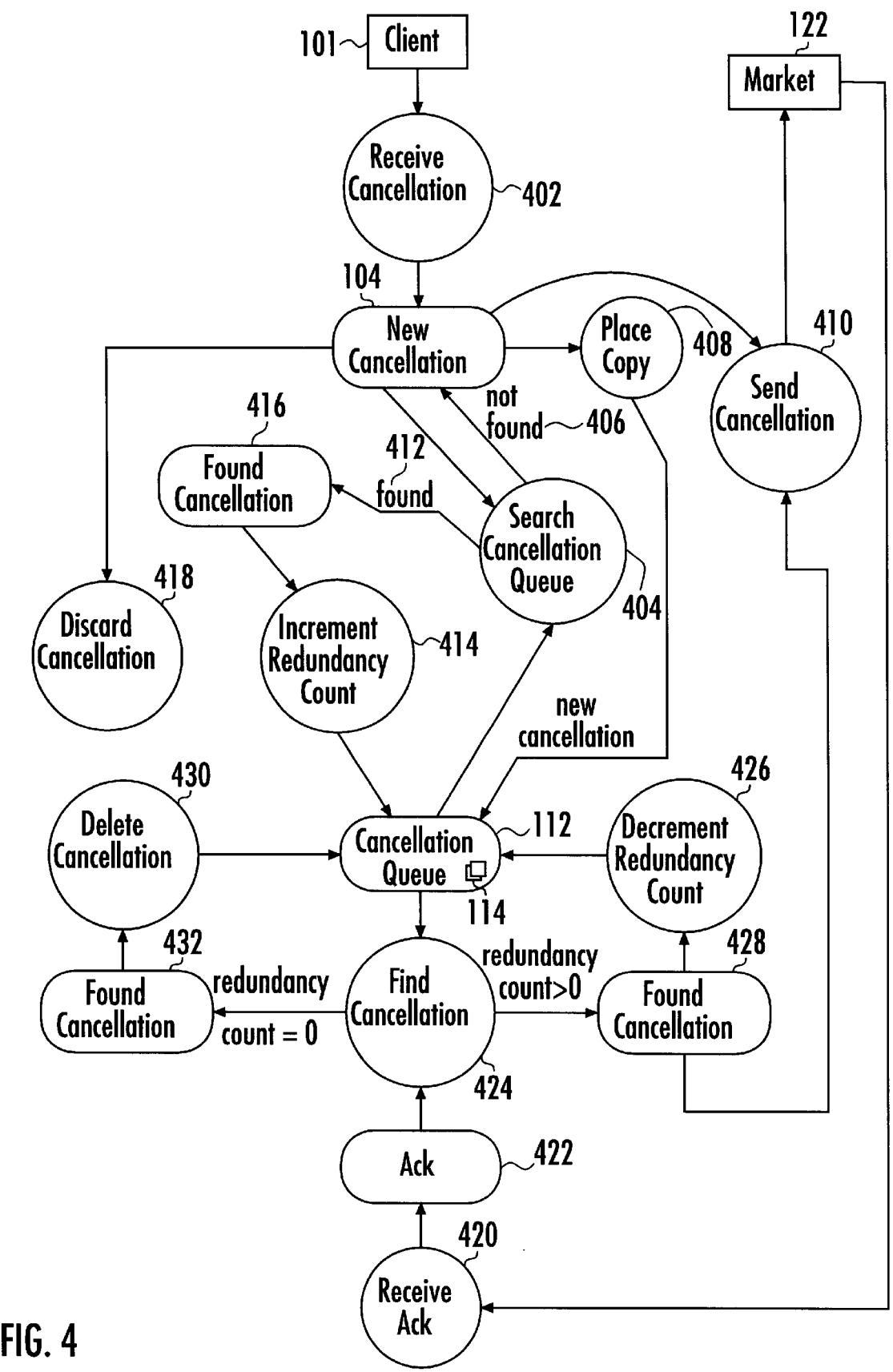
FIG. 4 illustrates an alternative embodiment of a process for canceling orders for securities.

Referring now to FIG. 4, an alternative embodiment of a process for canceling orders for securities in an automated securities trading broker-dealer system is illustrated. The illustrated embodiment includes the steps of receiving (402) from the client (101) a new cancellation (104) and searching (404) cancellation queue (112) for a cancellation (114) having an order identification equal to the new cancellation's order identification. According to the illustrated embodiment, if a cancellation (114) having an order identification equal to the new cancellation's order identification is not found (406) by searching (404) the cancellation queue (112), a copy of the new cancellation (104) is placed (408) in the cancellation queue (112) and the new cancellation (104) is sent (410) to the market (122). However, in embodiments of this kind, if a cancellation (104) having an order identification equal to the new cancellation's order identification is found (412) by searching (404) the cancellation queue (112), the redundancy count of the found cancellation (416) is incremented (414) in the cancellation queue (112) and the new cancellation (104) is discarded (418).

The embodiment shown in FIG. 4 further includes the steps of receiving (420) from the market (122) an acknowledgement (422) and finding (424) in the cancellation queue (112) a queued cancellation (114) corresponding to the received acknowledgement (422). In this embodiment, if a cancellation corresponding to the received acknowledgement (422) is found in the cancellation queue (112) and the redundancy count of the found cancellation (428) is greater than zero, the redundancy count of the found cancellation (428) is decremented and an additional cancellation corresponding to the found cancellation (428) is sent (410) to the market (122). However, in this kind of embodiment, if the redundancy count of the found cancellation (432) is equal to zero, the found cancellation (432) is deleted (430) from the cancellation queue (112).

Figure 4A:
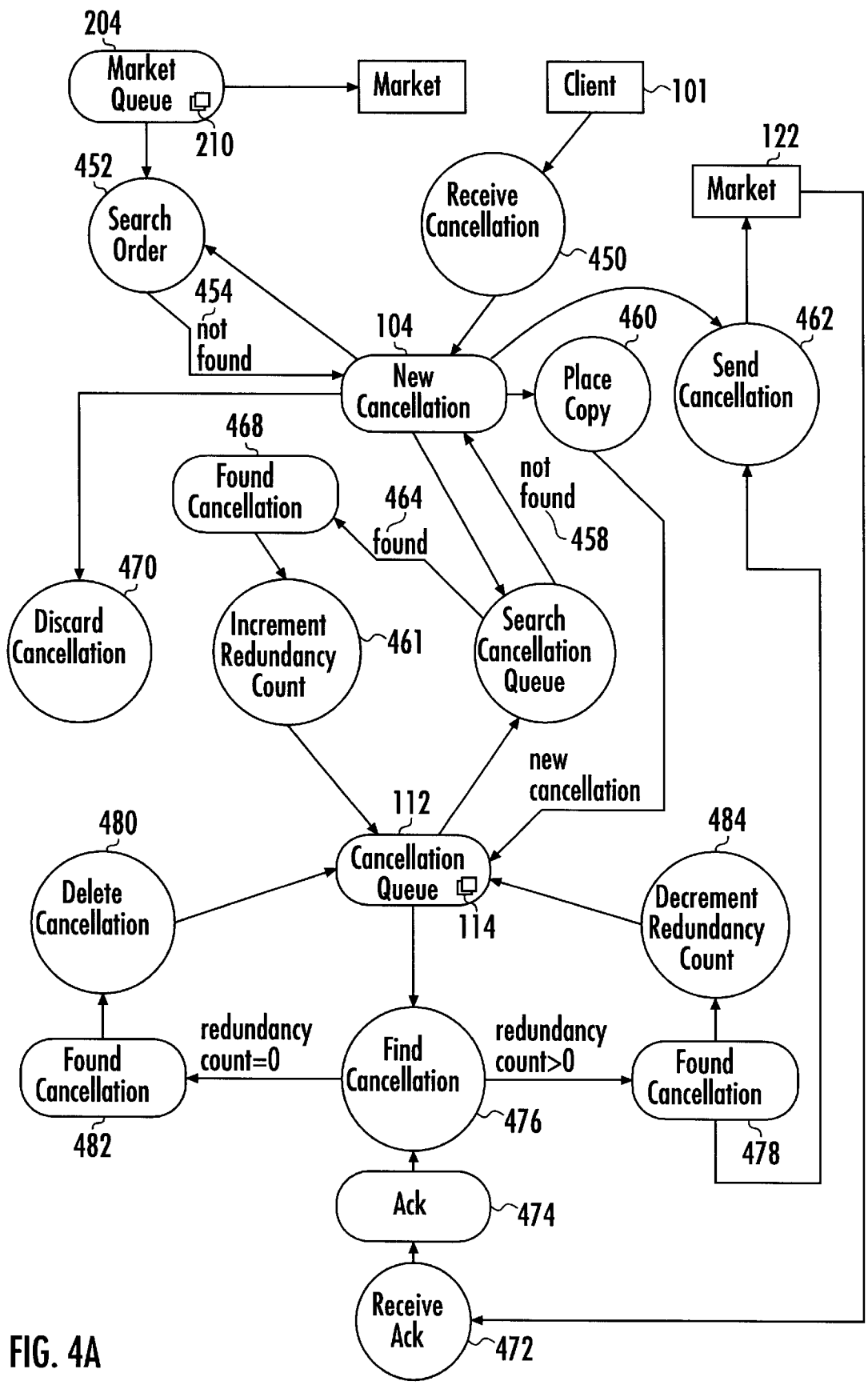
FIG. 4A illustrates an alternative embodiment of a process for canceling orders for securities wherein the orders are residing in a market queue waiting to be sent to the market.

Referring now to FIG. 4A, an alternative embodiment of a process for canceling orders for securities in an automated securities trading broker-dealer system is illustrated. The illustrated embodiment includes the steps of receiving (450) from the client (101) a new cancellation (104) and searching (452) the market queue (208) for an order (210) having the same order identification as the new cancellation (104) order identification. In embodiments of this kind, if an order (210) having the same order identification as the new cancellation (104) order identification is not found (454) in the market queue (208), the embodiment further includes the step of searching (456) a cancellation queue (112) for a cancellation (114) having an order identification equal to the new cancellation's order identification. In this embodiment, if a cancellation (114) having an order identification equal to the new cancellation's order identification is not found (458) by searching (456) the cancellation queue (112), a copy of the new cancellation (104) is placed (460) in the cancellation queue (112) and the new cancellation (104) is sent (462) to the market (122). However, in embodiments of this kind, if a cancellation (104) having an order identification equal to the new cancellation's order identification is found (464) by searching (456) the cancellation queue (112), the redundancy count in the found cancellation (468) is incremented (460) and the new cancellation (104) is discarded (470).

The embodiment shown in FIG. 4A further includes the steps of receiving (472) from the market (122) an acknowledgement (474) and finding (476) in the cancellation queue (112) a cancellation (114) corresponding to received response. In this embodiment, if a cancellation corresponding to the received acknowledgement (474) is found in the cancellation queue (112) and the redundancy count of the found cancellation is greater than zero, the redundancy count of the found cancellation (478) is decremented (484) in the cancellation queue (114) and an additional cancellation (478) corresponding to the found cancellation (478) is sent (462) to the market (122). However, in this kind of embodiment, if the redundancy count of the found cancellation (482) is equal to zero, the found cancellation (482) is deleted (480) from the cancellation queue (112).

Figure 5:
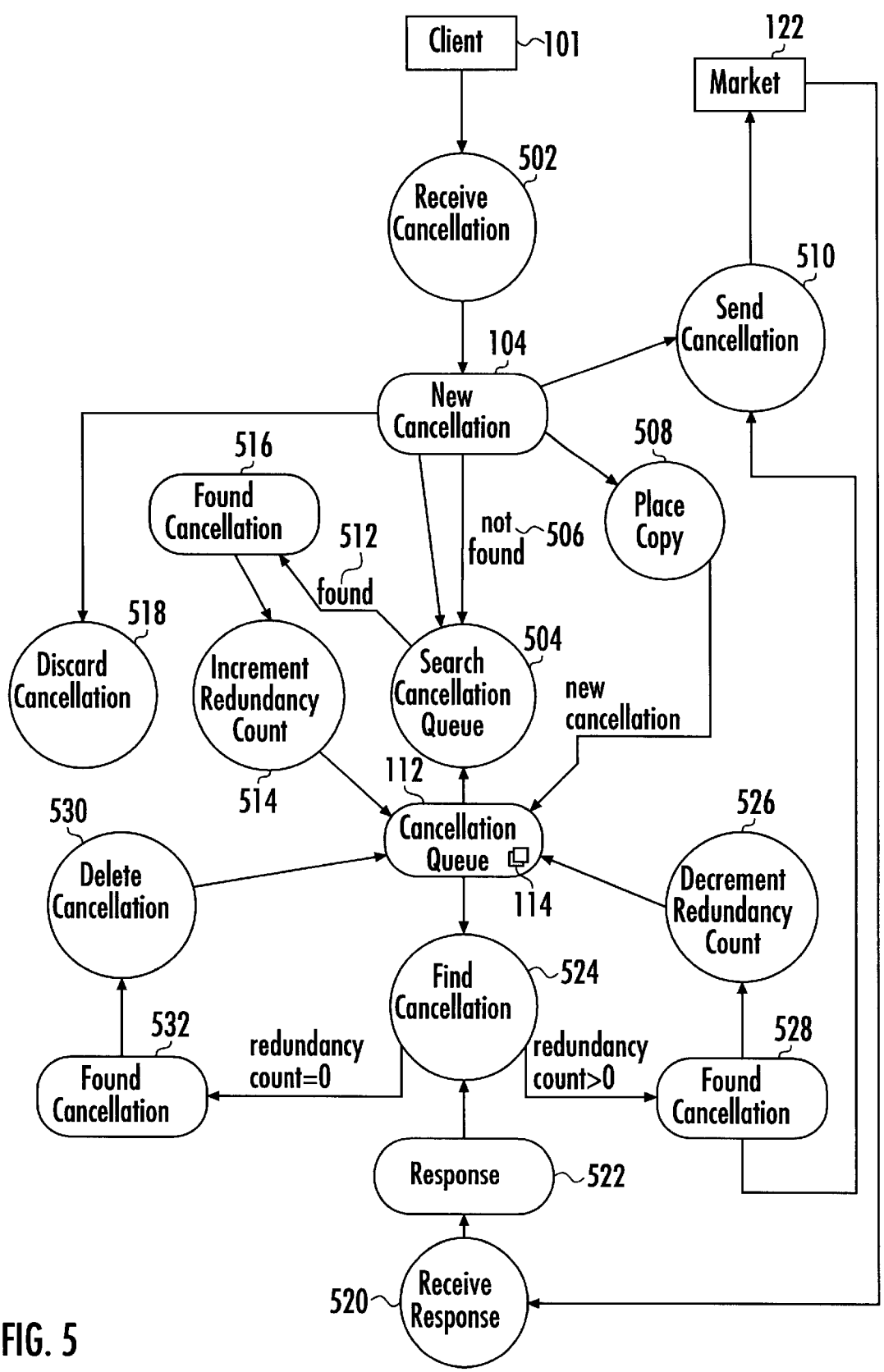
FIG. 5 illustrates an alternative embodiment of a process for canceling orders for securities.

Referring now to FIG. 5, an alternative embodiment of a process for canceling orders for securities in an automated securities trading broker-dealer system is illustrated. The illustrated embodiment includes the steps of receiving (502) from the client (101) a new cancellation (104) and searching (504) a cancellation queue (112) for a cancellation (114) having an order identification equal to the new cancellation's order identification. According to the illustrated embodiment, if a cancellation (114) having an order identification equal to the new cancellation's order identification is not found (506) by searching (504) the cancellation queue (112), a copy of the new cancellation (104) is placed (508) in the cancellation queue (112) and the new cancellation (104) is sent (510) to the market (122). However, in embodiments of this kind, if a cancellation (104) having an order identification equal to the new cancellation's order identification is found (512) by searching (504) the cancellation queue (112), the redundancy count of the found cancellation (516) is incremented (514) and the new cancellation (104) is discarded (518).

The embodiment shown in FIG. 5 further includes the steps of receiving (520) from the market (122) a response (522) to a cancellation and finding (524) in the cancellation queue (112) a cancellation (114) corresponding to the received response (522). In this embodiment, if a cancellation corresponding to the received response (522) is found in the cancellation queue (112) and the redundancy count of the found cancellation (528) is greater than zero, the redundancy count of the found cancellation (528) is decremented and an additional cancellation corresponding to the found cancellation (528) is sent (510) to the market (122). However, in embodiments of this kind, if the redundancy count of the found cancellation (532) is equal to zero, the found cancellation (532) is deleted (530) from the cancellation queue (112).

Figure 5A:
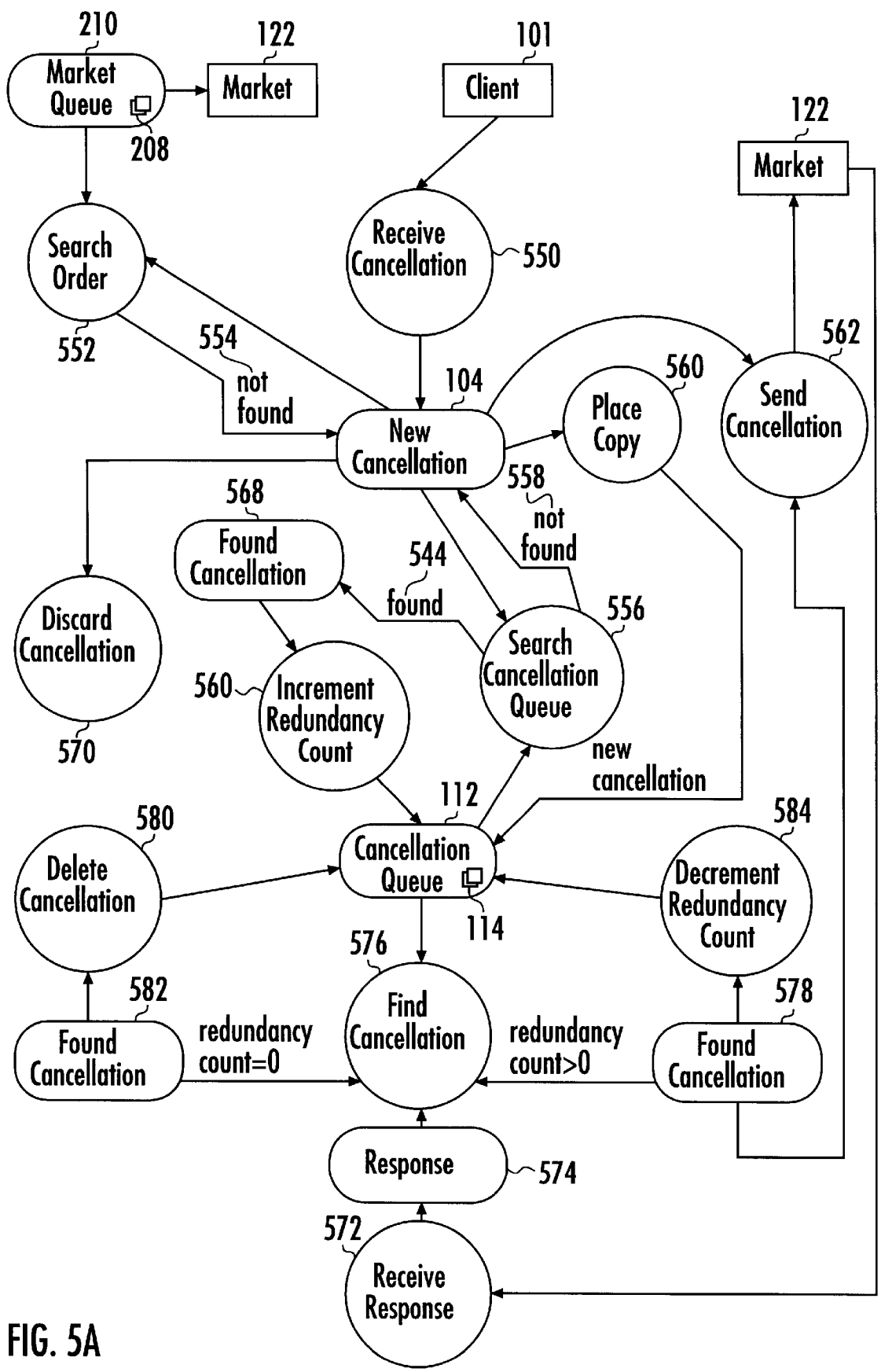
FIG. 5A illustrates an alternative embodiment of a process for canceling orders for securities wherein the orders are residing in a market queue waiting to be sent to the market.

Referring now to FIG. 5A, an alternative embodiment of a process for canceling orders, for securities in an automated securities trading broker-dealer system is illustrated. The illustrated embodiment includes the steps of receiving (550) from the client (101) a new cancellation (104) and searching (552) the market queue (208) for an order (210) having the same order identification as the new cancellation's order identification. In embodiments of this kind, if order (210) is not found (554) in the market queue (208), the embodiment further includes the step of searching (556) a cancellation queue (112) for a cancellation (114) having an order identification equal to the new cancellation's order identification. According to the illustrated embodiment, if a cancellation (114) having an order identification equal to the new cancellation's order identification is not found (558) by searching (556) the cancellation queue (112), a copy of the new cancellation (104) is placed (560) in the cancellation queue (112) and the new cancellation (104) is sent (562) to the market (122). However, in embodiments of this kind, if a cancellation (114) having an order identification equal to the new cancellation's order identification is found (568) by searching (556) the cancellation queue (112), the redundancy count of the found cancellation (568) is incremented (560) in the cancellation queue (112) and the new cancellation (104) is discarded (570).

The embodiment shown in FIG. 5A further includes the steps of receiving (572) from the market (122) a response (574) and finding (576) in the cancellation queue (114) corresponding to the received response (574). In this embodiment, if a cancellation corresponding to the received response (574) is found in the cancellation queue (112), the redundancy count of the found cancellation (578) is decremented (584) and an additional cancellation (578) corresponding to the found cancellation (578) is sent (562) to the market (122). However, in this kind of embodiment, if the redundancy count of the found cancellation (582) is equal to zero, the found cancellation (582) is deleted (580) from the cancellation queue (112).

Figure 6:
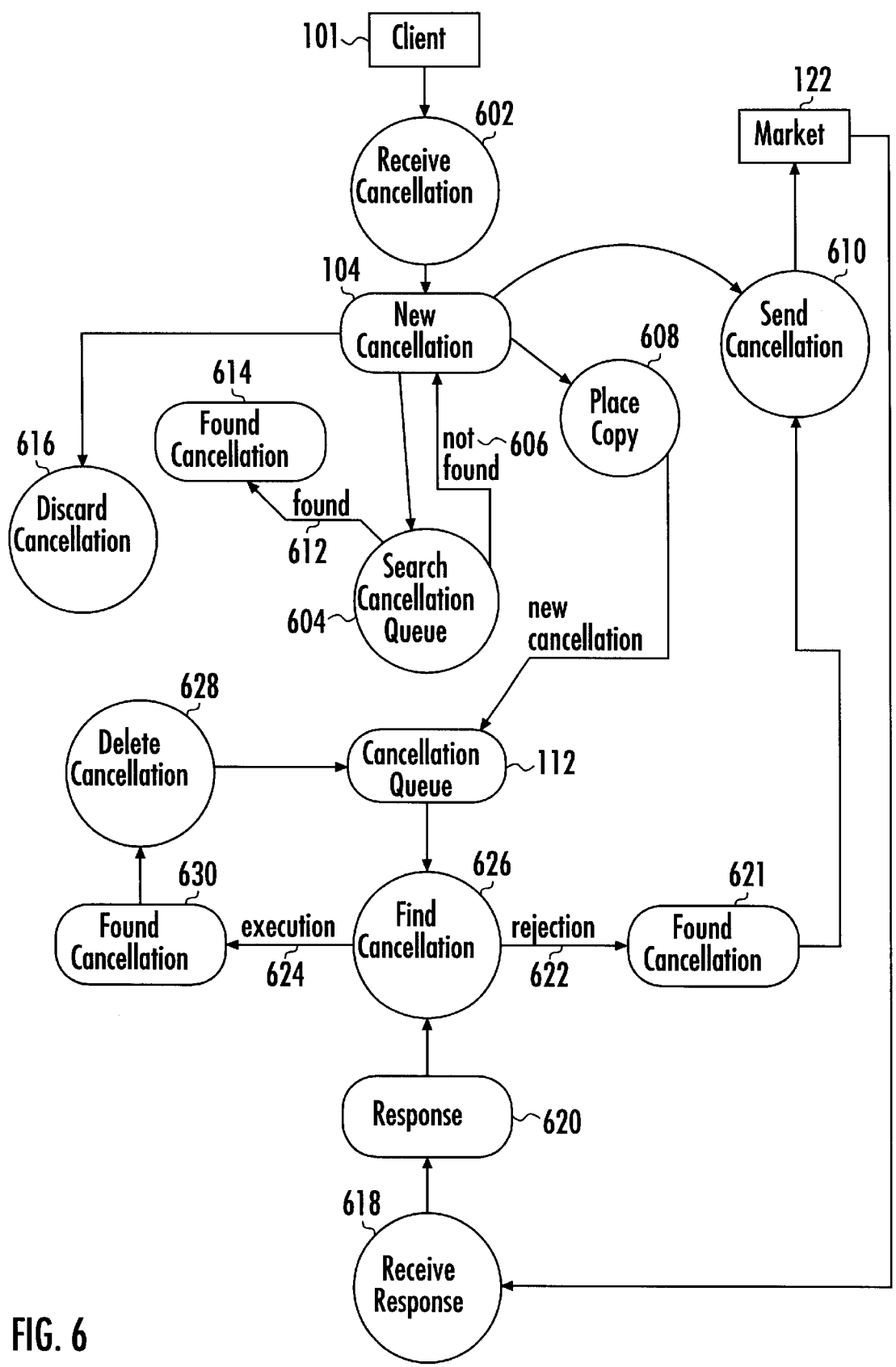
FIG. 6 illustrates an alternative embodiment of a process for canceling orders for securities.

Referring now to FIG. 6, an alternative embodiment of a process for canceling orders for securities in an automated securities trading broker-dealer system is illustrated. The illustrated embodiment includes the steps of receiving (602) from the client (101) a new cancellation (104) and the step of searching (604) the cancellation queue (112) for a cancellation (114) having an order identification equal to the new cancellation's order identification. According to the illustrated embodiment, if a cancellation (114) having an order identification equal to the new cancellation's order identification is not found (606) by searching (604) the cancellation queue (112), a copy of the new cancellation (104) is placed (608) in the cancellation queue (112) and the new cancellation (104) is sent (610) to the market (122). However, in this kind of embodiment, if a cancellation (114) having an order identification equal to the new cancellation's order identification is found (612) by searching (604) the cancellation queue (112), the new cancellation (104), which corresponds to the found cancellation (614), is discarded (616).

The embodiment shown in FIG. 6 includes the steps of receiving (618) from the market (122) a response (620) and finding (626) in the cancellation queue (112) a cancellation corresponding to the received response (620). In this embodiment, if the response (620) received from the market (122) is a rejection (622) an additional cancellation equivalent to the found cancellation (621) is sent (610) to the market (122). However, in this kind of embodiment, if the response (620) received (618) is a notification that the found cancellation (630) was executed (624) by the market (803), the found cancellation (630) is deleted (628) from the cancellation queue (112).

Figure 6A:
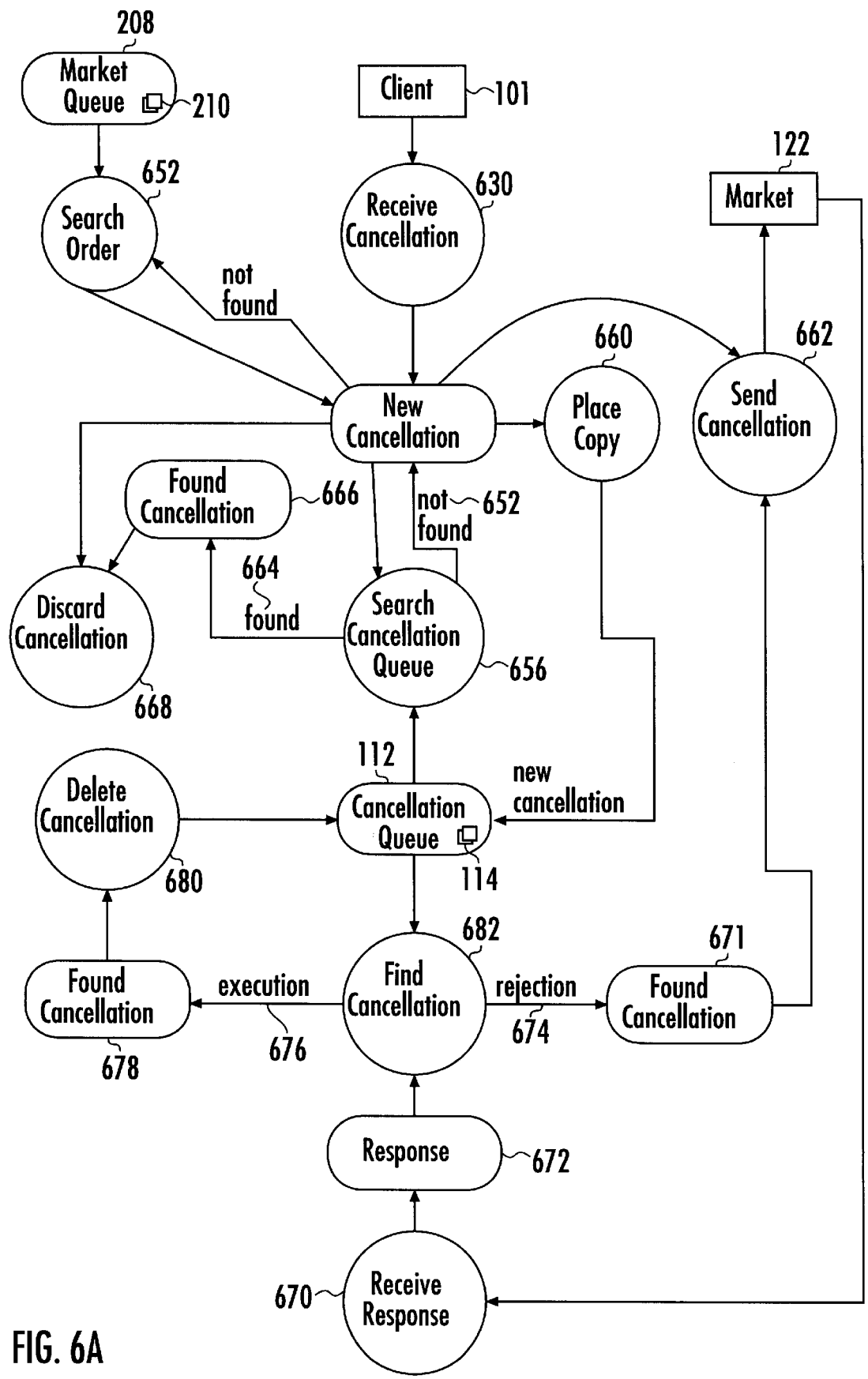
FIG. 6A illustrates an alternative embodiment of a process for canceling orders for securities wherein the orders are residing in a market queue waiting to be sent to the market.

Referring now to FIG. 6A, an alternative embodiment of a process for canceling orders for securities in an automated securities trading broker-dealer system is illustrated. The illustrated embodiment includes the steps of receiving (650) from the client (101) a new cancellation (104) and searching (652) the market queue (208) for an order (210) having the same order identification as the new cancellation's order identification. In this embodiment, if an order (210) having the same order identification as the new cancellation's order identification is not found in the market queue (208), the embodiment further includes the step of searching (656) the cancellation queue (112) for a cancellation (114) having an order identification (108) equal to the new cancellation's order identification. According to the illustrated embodiment, if a cancellation (114) having an order identification equal to the new cancellation's order identification is not found (658) by searching (656) the cancellation queue (112), a copy of the new cancellation (104) is placed (660) in the cancellation queue (112) and the new cancellation (104) is sent (662) to the market (122). However, in this kind of embodiment, if a cancellation (114) having an order identification equal to the new cancellation's order identification is found (664) by searching (656) the cancellation queue (112), the new cancellation (104), which corresponds to the found cancellation (666), is discarded (668).

The embodiment shown in FIG. 6A further includes the steps of receiving (670) a response (672) from the market (122) and finding (682) a cancellation (114) in the cancellation queue (112) corresponding to the received response (672). In this embodiment, if the response (672) received (670) from the market (122) is a rejection (674), an additional cancellation, corresponding to the found cancellation (671), is sent (662) to the market (122). However, in this kind of embodiment, if the response (672) received (670) from the market (122) is a notification that the found cancellation (678) was executed (676) by the market (122) the found cancellation (678) is deleted (680) from the cancellation queue (112).

Figure 7:
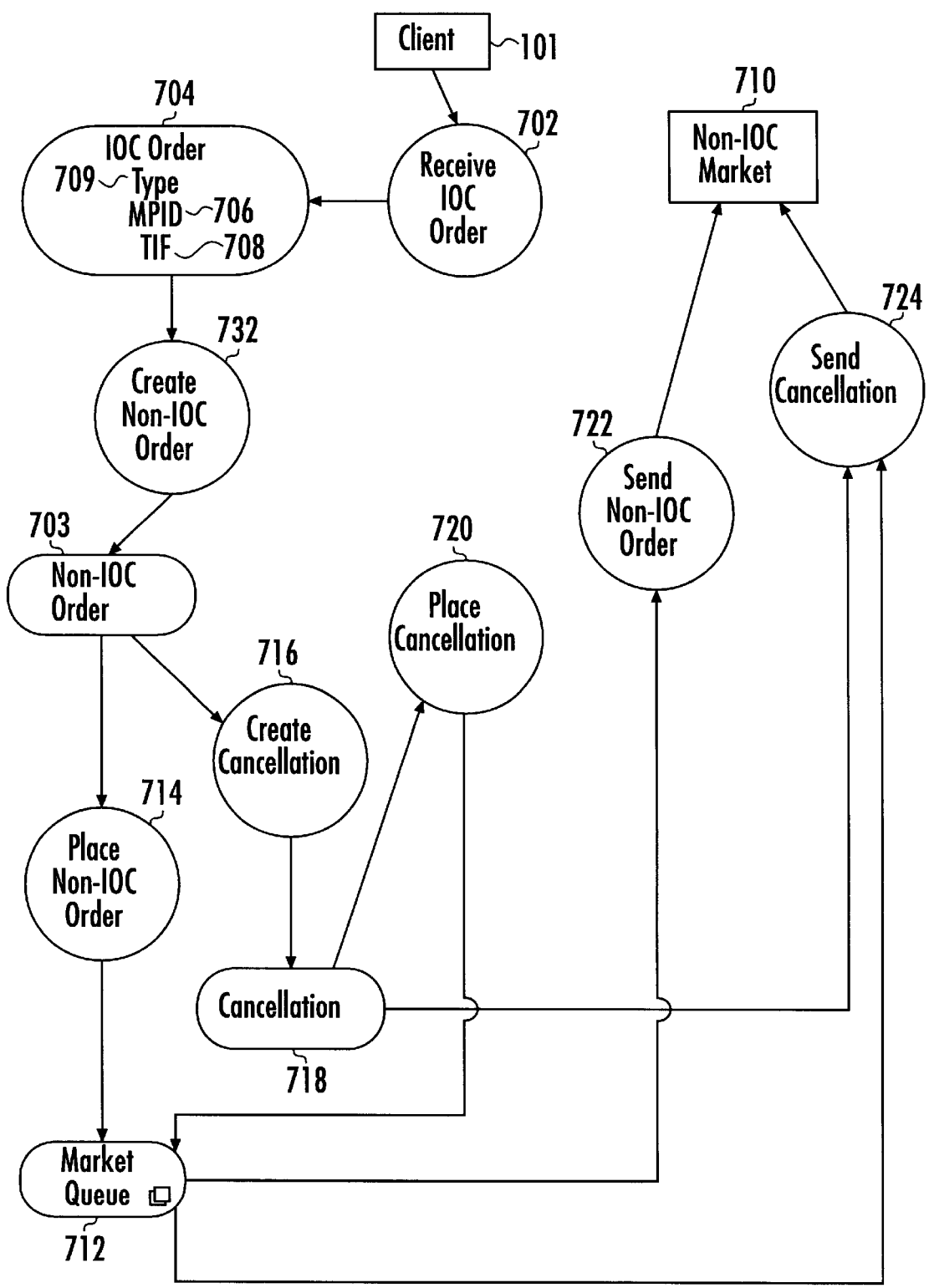
FIG. 7 illustrates a process for sending an IOC order to the market.

Referring now to FIG. 7, another aspect of the invention is seen, a process for an automated securities trading broker-dealer system that emulates immediate or cancel (IOC) orders for markets that do not support IOC orders. The illustrated embodiment includes the step of receiving (702) from the client (101) an IOC order (704). An IOC order (704) is typically executed immediately or cancelled. In some embodiments, "IOC" is encoded as TIF (708) equal to zero and in other embodiments "IOC" is encoded in a type code (709). In this embodiment, if MPID (706) in the IOC order (704) identifies a market that does not support IOC orders, the embodiment further includes the step of creating (732) a non-TOC order (703) by setting the TIF (708) in IOC order (704) to the minimum value allowed in the non-IOC market (710).

The embodiment shown in FIG. 7 further includes the steps of placing (714) the non-IOC order (703) in the market queue (712), creating (716) a cancellation (718) for the non-IOC order (708) and placing (720) the cancellation (718) in the market queue (712) immediately behind non-IOC order (703). In the illustrated embodiment, the non-IOC order (703) and the cancellation (718) placed in market queue (712) are sent (722, 724) to non-IOC market (710) so that the cancellation (718) arrives at the non-IOC market (710) immediately after the non-IOC order (703). Because the non-IOC order (703) will be quickly canceled if it is not filled immediately upon arrival in the market, this embodiment effectively emulates an IOC order by use of a non-IOC order followed by a cancellation.

Figure 8:
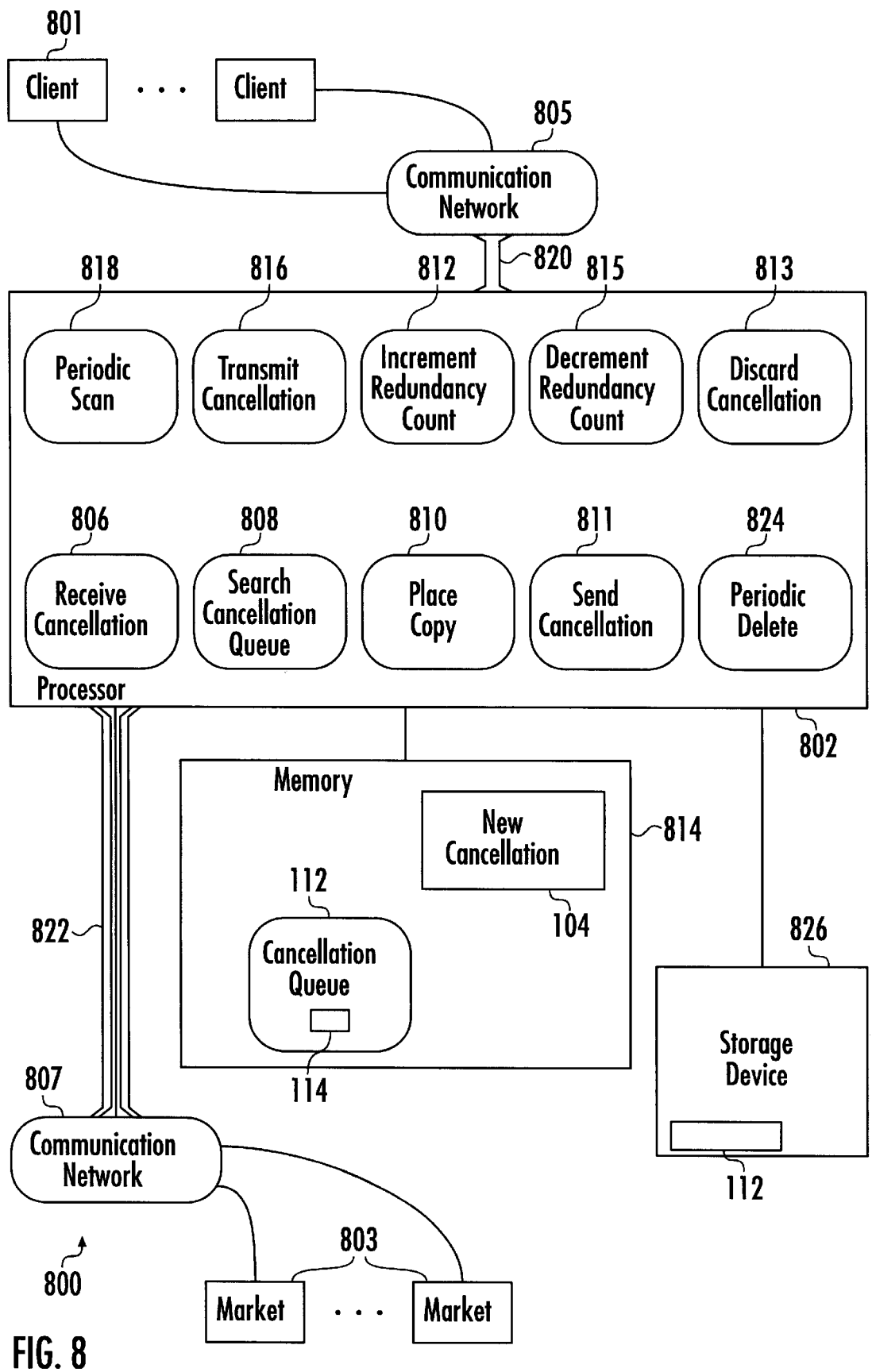
FIG. 8 illustrates a system for canceling orders for securities.

Referring now to FIG. 8, according to a further aspect of the invention, a system (800) for canceling orders for securities in an automated securities trading broker-dealer system is seen implemented in hardware and software operating on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments the automated computing machinery comprises software stored in read only memory. In other embodiments, the automated computing machinery comprises software stored in programmable read only memory.

The embodiment in FIG. 8 shows system (800) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system (803) in various embodiments, for example, are a mainframe, a minicomputer, a personal computer, a workstation, a laptop, or any such type of processing system. Additionally in typical embodiments, the system (800) is coupled to multiple client systems (801) and multiple market systems (803). The market systems are typically one or more financial exchanges, ECN's, broker-dealers, or market makers.

The illustrated embodiment, shown in FIG. 8, further includes processor (802) programmed to receive (806) a new cancellation (104) and to search (808) the cancellation queue (112) for a cancellation (114) having an order identification equal to the new cancellation's order identification. According to the illustrated embodiment, if a cancellation (114) having an order identification equal to the new cancellation's order identification is not found by searching (808) the cancellation queue (112), the processor (802) is further programmed to place (810) a copy of the new cancellation (104) in the cancellation queue (112) and the new cancellation (104) is sent (811) to the market (803). However, in this kind of embodiment, if a cancellation (114) having an order identification equal to the new cancellation's order identification is found by searching (808) the cancellation queue (112), the processor (802) is further programmed to increment (812) in the cancellation queue (112) the redundancy count of the found cancellation and discard (813) the new cancellation (104).

In the embodiment shown in FIG. 8, processor (802) is programmed to periodically scan (818) the cancellation queue (112) for queued cancellations having a redundancy count greater than zero. In this kind of embodiment, the processor (802) is further programmed to decrement (815) the redundancy count of each queued cancellation having a redundancy count greater than zero and to send (811) an additional cancellation (114) to the market (803).

In a further embodiment shown in FIG. 8, processor (802) is programmed to periodically scan (818) the cancellation queue (112) for queued cancellations having a redundancy count equal to zero. In this kind of embodiment, the processor (802) is further programmed to delete (824) from the cancellation queue (112) each queued cancellation (114) having a redundancy count equal to zero.

According to an even more specific embodiment, the processor (802) is programmed to scan (818) the cancellation queue (112) every three seconds for queued cancellation having a redundancy count greater than zero. In this kind of embodiment, processor (802) is further programmed to decrement (815) the redundancy count of each queued cancellation having a redundancy count greater than zero. In alternative embodiments, the processor (802) is programmed to scan the cancellation queue (112) in time intervals other than three seconds. All scanning intervals are within the scope of this invention.

According to the illustrated embodiment, memory (814) is coupled to the processor (802). In this embodiment, the processor (802) is programmed to transmit (816) the new cancellation (104) to memory (814) for storage in the cancellation queue (112).

In a further embodiment shown in FIG. 8, data storage device (826) is coupled to processor (802). In some embodiments, processor (802) is programmed to transmit (816) a copy of each received new cancellation (104) to storage device (826). In many embodiments, the entire cancellation queue (112) is periodically copied to the storage device (826). Generally, storage device (826) is used for recovery of system (800) in case of data loss. Storage device (826) is typically a hard drive, a tape drive, a floppy disk drive, an optical drive or any non-volatile storage medium.

In a further embodiment shown in FIG. 8, communication ports (820, 822) are coupled to processor (802). In this embodiment, the processor (802) is programmed to receive (802) the new cancellation (104) from the client (801). In the illustrated embodiment, communication port (820) interfaces with communication network (805) and typically provides the means for data transmission to system (800).

In a further embodiment of the invention, the processor (802) is programmed to send (811) the new cancellation (104) to the market (803) through communication port (822). According to an even more specific embodiment of the invention, the processor (802) is further programmed to send (811) an additional cancellation to the market through communication port (822). In the illustrated embodiment, communication port (822) interfaces with the communication network (807) and typically provides the means for data transmission from system (800).

Figure 9:
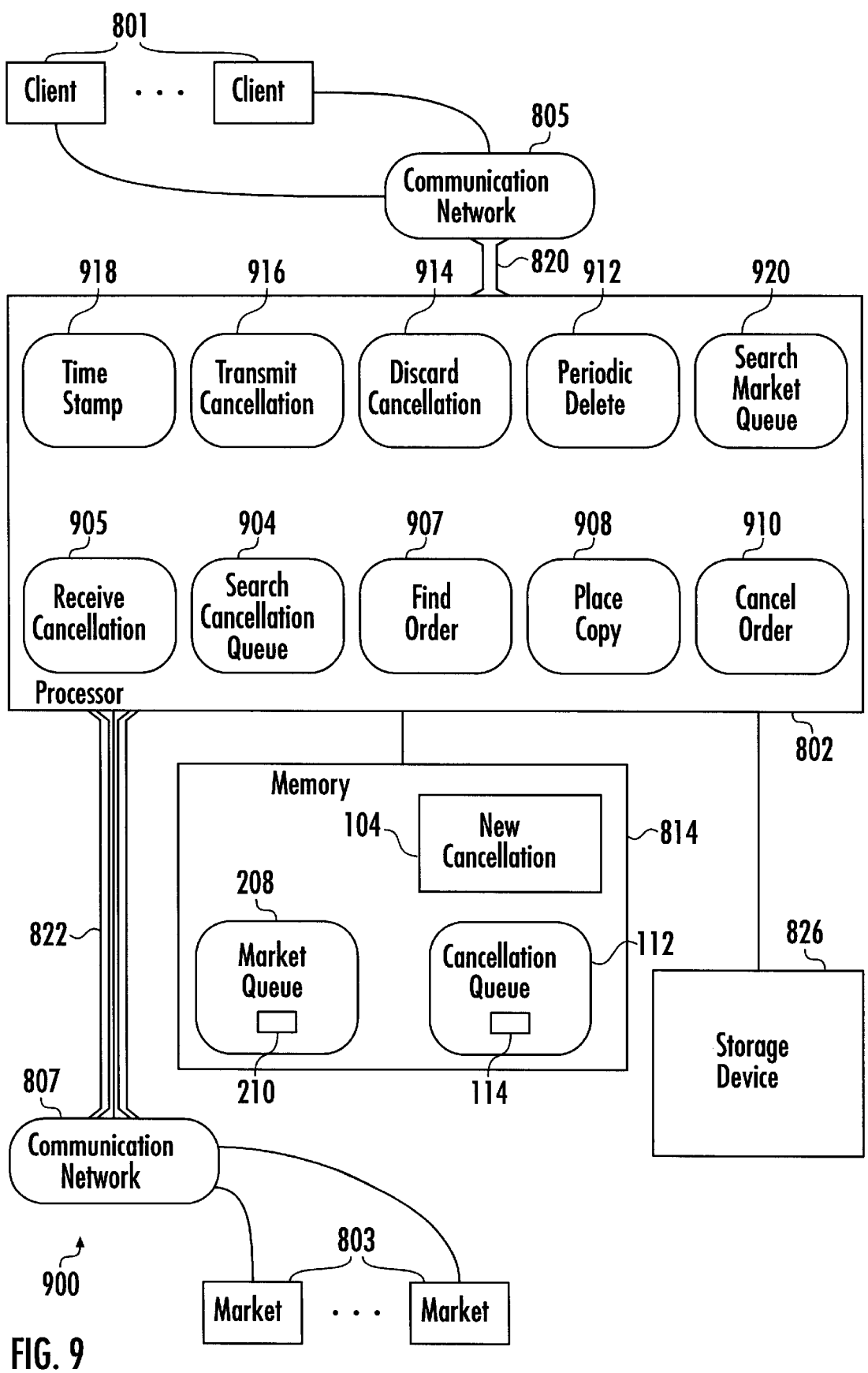
FIG. 9 illustrates an alternative embodiment of a system for canceling orders for securities wherein the orders are residing in a market queue waiting to be sent to the market.

Referring now to FIG. 9, an alternative embodiment of a system (900) for canceling orders for securities in an automated securities trading broker-dealer system is seen implemented in software and hardware on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments the automated computing machinery comprises software stored in read only memory. In other embodiments, the automated computing machinery comprises software stored in programmable read only memory.

The embodiment in FIG. 9 shows system (900) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system (803) in various embodiments, for example, are a mainframe, a minicomputer, a personal computer, a workstation, a laptop, or any such type of processing system. In the illustrated embodiment, system (900) is coupled to multiple client systems (801) and multiple market systems (803). The market systems are typically one or more financial markets, ECN's, broker-dealers, or market makers.

The system of the illustrated embodiment, shown in FIG. 9, includes processor (802) programmed to receive (906) a new cancellation (104) and to search (920) market queue (208) for an order (210) having an order identification equal to the new cancellation's order identification. In this embodiment, if order (210) is found (907) in market queue (208) waiting to be sent to market (803), processor (802) is further programmed to search (904) cancellation queue (112) for a cancellation (114) having an order identification equal to the new cancellation's order identification. In this embodiment, if a cancellation (114) having an order identification equal to the new cancellation's order identification is not found in the cancellation queue (112), processor (802) is further programmed to record (918) on the new cancellation (104) the time when the new cancellation was received, to place (908) a copy of the new cancellation (104) in the cancellation queue (112) and cancel (910) the order (210) having an order identification equal to the new cancellation in the market queue (208). However, in embodiments of this kind, if a cancellation (114) having an order identification equal to the new cancellation's order identification is found by searching (904) the cancellation queue (112), processor (802) is programmed to discard (914) the new cancellation (104). According to an even more specific embodiment, processor (802) is programmed to periodically delete (912) queued cancellations (114) dependent upon their ages.

In the illustrated embodiment shown in FIG. 9, memory (814) is coupled to processor (802). In this embodiment, processor (802) is further programmed to transmit (916) the new cancellation (104) to memory (814) for storage in the cancellation queue (112).

In a further embodiment shown in FIG. 9, communication port (820) is coupled to the processor (802). In this embodiment, the processor (802) is programmed to receive (902) the new cancellation (104) from the client (801). In the illustrated embodiment, communication port (820) interfaces with communication network (805) and typically provides the means for data transmission to system (900).

In a further embodiment illustrated in FIG. 9, data storage device (826) is coupled to processor (802). In some embodiments, a copy of each received (806) new cancellation (104) is transmitted to storage device (826). In many embodiments, the entire cancellation queue (112) is periodically copied to storage device (826). Generally, storage device (826) is used for recovery of system (900) in case of data loss. Storage device (826), for example is typically a hard drive, a tape drive, a floppy disk drive, an optical drive or any non-volatile storage medium.

Figure 10:
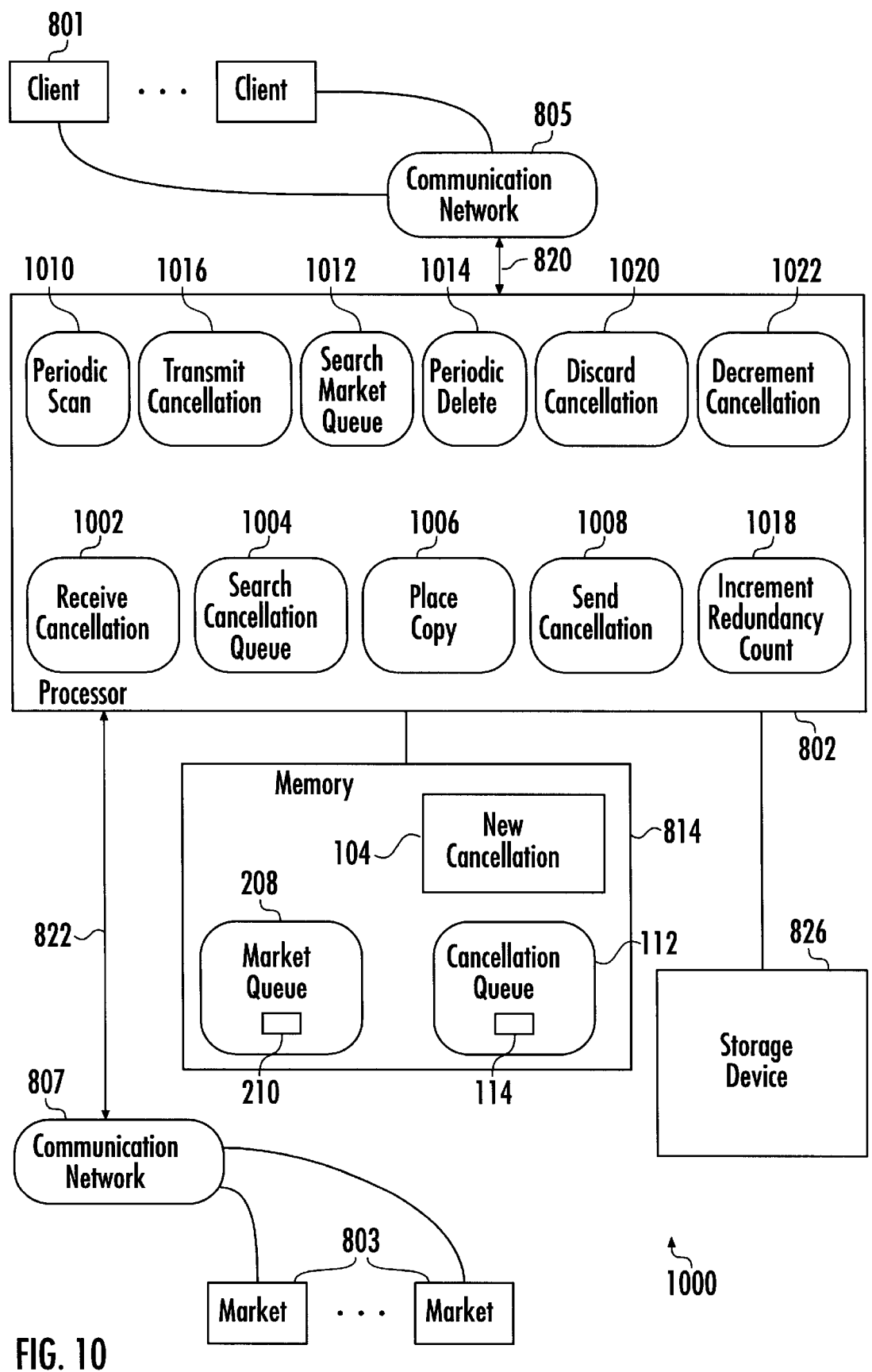
FIG. 10 illustrates an alternative embodiment of a system for canceling orders for securities wherein the orders are residing in a market queue waiting to be sent to the market.

Referring now to FIG. 10, an alternative embodiment of a system (1000) for canceling orders for securities in an automated securities trading broker-dealer system is seen implemented in hardware and software operating on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments, the automated computing machinery comprises software stored in read only memory. In other embodiments, the automated computing machinery comprises software stored in programmable read only memory.

The embodiment in FIG. 10 shows system (1000) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system (803) in various embodiments, for example, are a mainframe, a minicomputer, a personal computer, a workstation, a laptop, or any such type of processing system. Additionally in typical embodiments, the system (1000) is coupled to multiple client systems (801) and multiple market systems (803). The market systems are typically one or more financial exchanges, broker-dealers, or market makers.

In the illustrated embodiment, in FIG. 10, processor (802) is programmed to receive (1002) a new cancellation (104) and search (1012) market queue (208) for an order (210) having the same order identification as the new cancellation's order identification. In this embodiment, if an order (210) having the same order identification as new cancellation (104) is not found in market queue (208), processor (802) is further programmed to search (1004) the cancellation queue (112) for a cancellation (114) having an order identification equal to the new cancellation's order identification. According to the illustrated embodiment, if a cancellation (114) having an order identification equal to the new cancellation's order identification is not found by searching (1004) the cancellation queue (112), the processor (802) is programmed to place (1006) a copy of the new cancellation (104) in the cancellation queue (112) and to send (1008) new cancellation (104) to the market (803). However, in this kind of embodiment, if a cancellation (114) having an order identification equal to the new cancellation's order identification is found by searching (1004) the cancellation queue (112), the processor (802) is further programmed to increment (1018) in the cancellation queue (112) the redundancy count of the found cancellation and discard (1020) the new cancellation (104).

In the embodiment shown in FIG. 10, the processor (802) is programmed to periodically scan (1010) the cancellation queue (112) for queued cancellations having a redundancy count greater than zero. In this kind of embodiments, the processor (802) is further programmed to decrement (1022) the redundancy count of each cancellation having a redundancy count greater than zero and to send (1008) an additional cancellation (114) to the market (803).

In a further embodiment shown in FIG. 10, processor (802) is programmed to periodically scan (1010) the cancellation queue (112) for queued cancellations (114) having a redundancy count equal to zero. In this kind of embodiment, the processor is further programmed to delete (1014) from the cancellation queue (112) each queued cancellation (114) having a redundancy count equal to zero.

According to an even more specific embodiment, the processor (802) is programmed to scan (1010) the cancellation queue (112) every three seconds for queued cancellations (114) having a redundancy count greater than zero. In this kind of embodiment the processor is further programmed to decrement (1022) the redundancy count for each queued cancellation (114) having a redundancy count greater than zero. In alternative embodiments, the processor (802) is programmed to scan (1010) the cancellation queue (112) at time intervals other than three seconds. All scanning intervals are within the scope of this invention.

According to the illustrated embodiment, memory (814) is coupled to the processor (802). In this embodiment, the processor (802) is programmed to transmit (1016) the new cancellation (104) to the memory (814) for storage in the cancellation queue (112).

In a further embodiment shown in FIG. 10, data storage device (826) is coupled to processor (802). In some embodiments, processor (802) is programmed to transmit (1016) a copy of each received (1002) new cancellation (104) to storage device (826). In many embodiments, the entire cancellation queue (112) is periodically copied to storage device (826). Generally, storage device (826) is used for recovery of system (1000) in case of data loss. Storage device (826) is typically a hard drive, a tape drive, a floppy disk drive, an optical drive or any non-volatile storage medium.

In a further embodiment shown in FIG. 10, communication ports (820, 822) are coupled to the processor (802). In this embodiment, the processor (802) is programmed to receive (802) the new cancellation (104) from the client (801) through communication port (820). In the illustrated embodiment, communication port (820) interfaces with the communication network (805) and typically provides the means for data transmission to system (1000).

In a further embodiment of the invention, the processor (802) is programmed to send (1008) the new cancellation (104) to the market (803) through communication port (822). According to an even more specific embodiment of the invention, the processor (802) is further programmed to send (1008) an additional cancellation to the market through communication port (822). In the illustrated embodiment, communication port (822) interfaces with the communication network (807) and typically provides the means for data transmission from system (1000).

Figure 11:
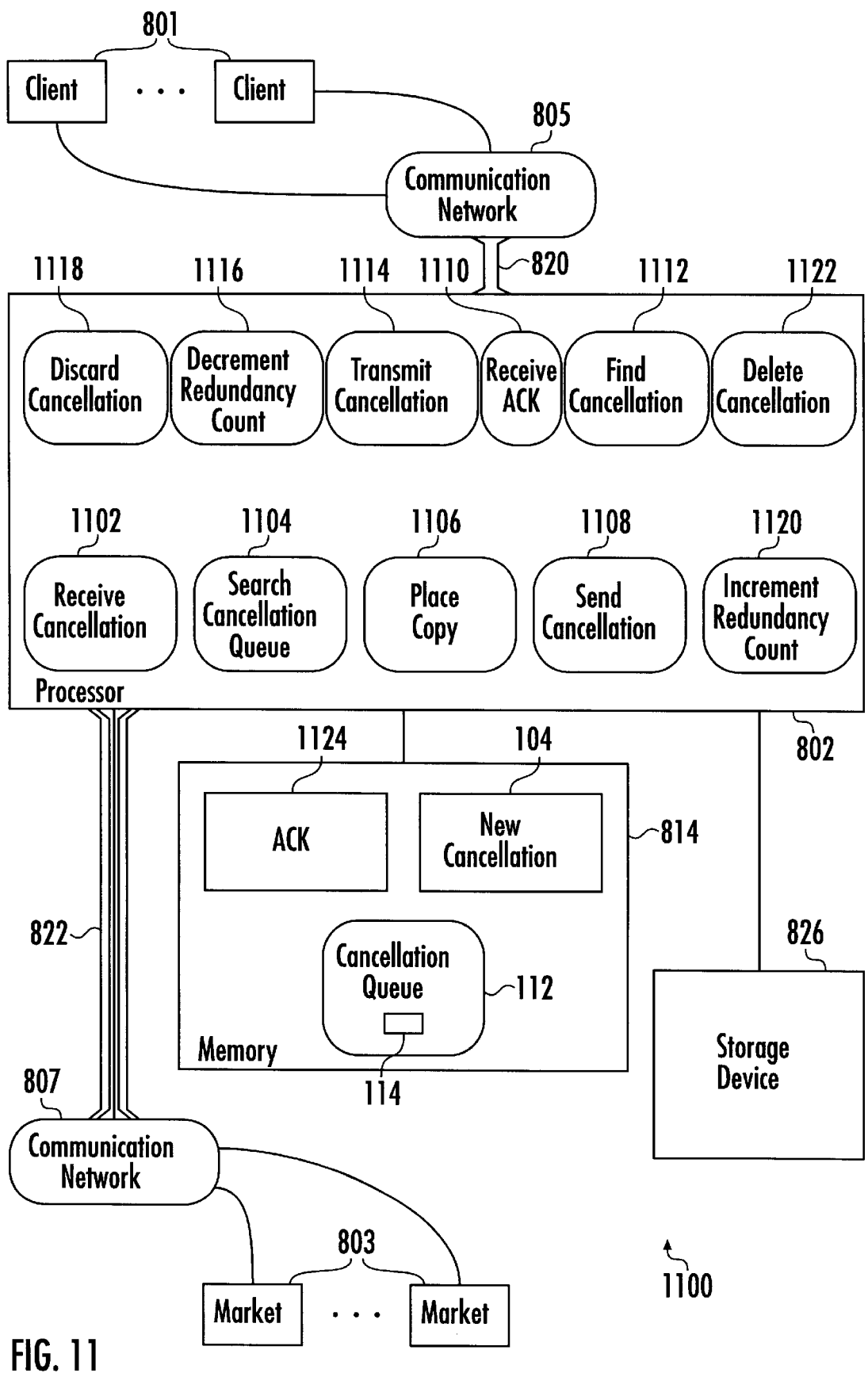
FIG. 11 illustrates an alternative embodiment of a system for canceling orders for securities.

Referring now to FIG. 11, an alternative embodiment of a system (1100) for canceling orders for securities in an automated securities trading broker-dealer system is seen implemented in hardware and software operating on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments the automated computing machinery comprises software stored in read only memory. In other embodiments, the automated computing machinery comprises software stored in programmable read only memory.

The embodiment in FIG. 11 shows system (1100) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system (803) in various embodiments, for example, are a mainframe, a minicomputer, a personal computer, a workstation, a laptop, or any such type of processing system. In the illustrated embodiment, system (1100) is coupled to multiple client systems (801) and multiple market systems (803). The market systems (803) are typically one or more financial exchanges, ECN's, broker-dealers, or market makers.

The illustrated embodiment in FIG. 11 further includes processor (802) programmed to program to receive (1102) a new cancellation (104) and to search (1104) cancellation queue (112) for a cancellation (114) having an order identification equal to the new cancellation's order identification. According to the illustrated embodiment, if no cancellation having an order identification equal to the new cancellation's order identification is found by searching (1104) the cancellation queue (112), the processor (802) is further programmed to place (1106) a copy of the new cancellation (104) in the cancellation queue (112) and send (1108) the new cancellation (104) to a market (803). However, in this kind of embodiment, if a cancellation (114) having an order identification equal to the new cancellation's order identification is found by searching (1104) the cancellation queue (112), the processor (802) is programmed to increment (1120) in the cancellation queue (112) the redundancy count of the found cancellation and discard (1118) the new cancellation (104).

The embodiment shown in FIG. 11 further includes the processor (802) programmed to receive (1110) an acknowledgement (1124) to a cancellation and to find (1112) in the cancellation queue (112) a queued cancellation (114) corresponding to the received acknowledgement (1124). In this embodiment, if the found queued cancellation (114) has a redundancy count greater than zero, processor (802) is programmed to decrement (1116) the redundancy count of the queued cancellation (114) and to send (1108) an additional cancellation corresponding to the queued cancellation (114) to the market (803). However, in this kind of embodiment, if the found queued cancellation (114) has a redundancy count equal to zero, processor (802) is programmed to delete (1122) the queued cancellation (114) from the cancellation queue (112).

According to the illustrated embodiment, memory (814) is coupled to the processor (802). In this embodiment, the processor (802) is programmed to transmit (1114) the new cancellation (104) to the memory (814) for storage in the cancellation queue (112).

In a further embodiment shown in FIG. 11, data storage device (826) is coupled to the processor (802). In some embodiments, the processor (802) is programmed to transmit (1114) a copy of each received (1102) new cancellation (104) to storage device (826). In many embodiments, the entire cancellation queue (112) is periodically copied to storage device (826). Generally, storage device (826) is used for recovery of the system (1100) in case of data loss. Storage device (826) is typically a hard drive, a tape drive, a floppy disk drive, an optical drive or any non-volatile storage medium.

In a further embodiment shown in FIG. 11, communication ports (820, 822) are coupled to the processor (802). In this embodiment, the processor (802) is programmed to receive (1102) the new cancellation (104) from the client (801) through communication port (820). In the illustrated embodiment, communication port (820) interfaces with the communication network (805) to provide a means for data transmission to system (1100).

In a further embodiment of the invention, the processor (802) is programmed to send (1108) the new cancellation (104) to the market (803) through communication port (822). According to an even more specific embodiment of the invention, the processor (802) is further programmed to send (1108) an additional cancellation to the market (803) through communication port (822). In the illustrated embodiment, communication port (822) interfaces with communication network (807) to provide a means for data transmission from system (1100).

Figure 11A:
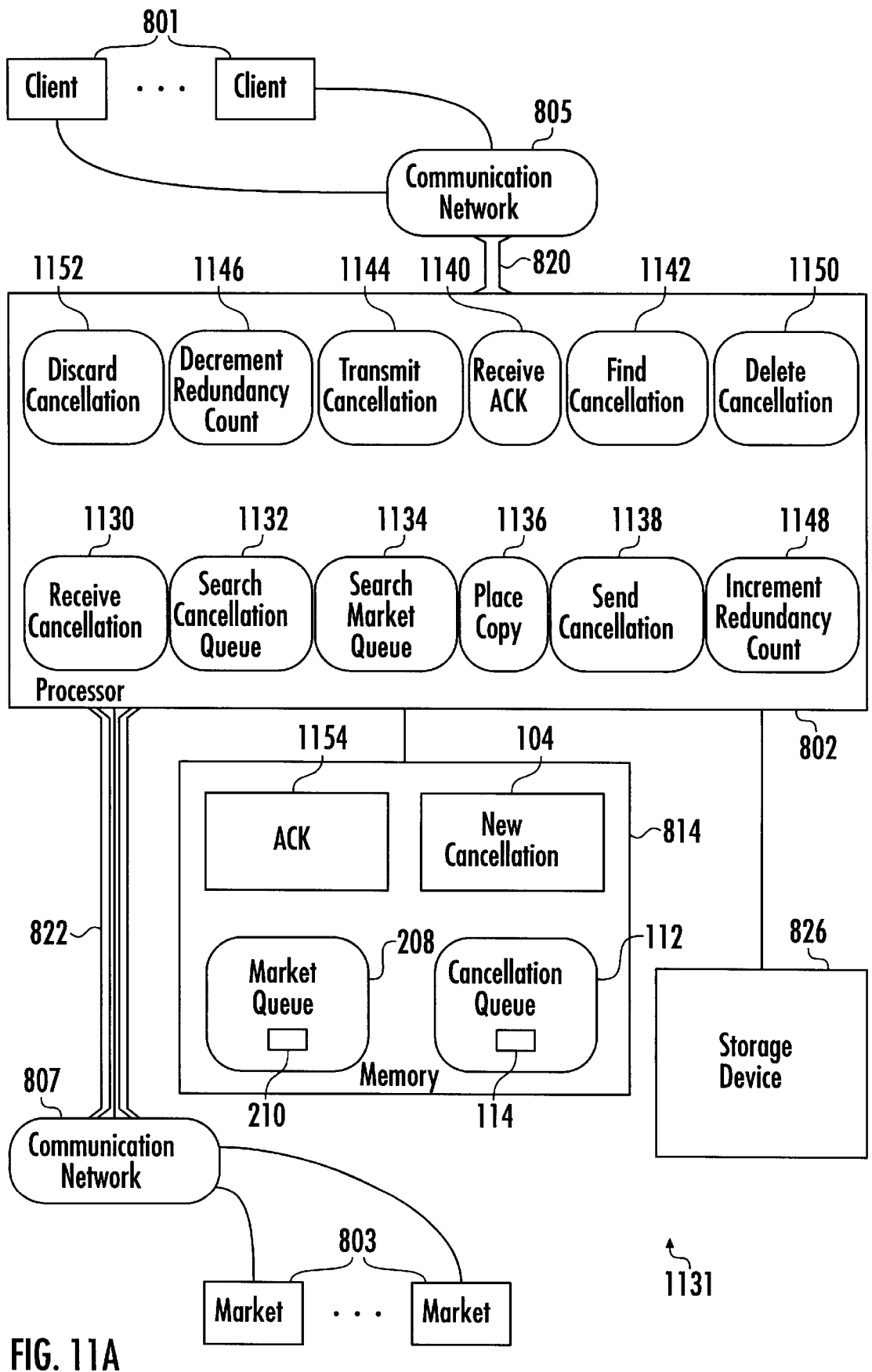
FIG. 11A illustrates an alternative embodiment of a system for canceling orders for securities wherein the orders are residing in a market queue waiting to be sent to the market.

Referring now to FIG. 11A, an alternative embodiment of a system (1131) for canceling orders for securities in an automated securities trading broker-dealer system is seen implemented in hardware and software operating on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments the automated computing machinery comprises software stored in read only memory. In other embodiments, the automated computing machinery comprises software stored in programmable read only memory.

The embodiment in FIG. 11A shows system (1131) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system (803) in various embodiments, for example, are a mainframe, a minicomputer, a personal computer, a workstation, a laptop, or any such type of processing system. In the illustrated embodiment, system (1131) is coupled to multiple client systems (801) and multiple market systems (803). The market systems (803) are typically one or more financial exchanges, ECN's, broker-dealers, or market makers.

The illustrated embodiment in FIG. 11A includes processor (802) programmed to receive (1130) a new cancellation (104) and to search (1134) the market queue (208) for an order (210) having the same order identification as the new cancellation's order identification. In this embodiment, if an order (210) having the same order identification as the new cancellation's order identification is not found in market queue (208), processor (802) is further programmed to search (1132) the cancellation queue (112) for a cancellation (114) having an order identification equal to the new cancellation's order identification. According to the illustrated embodiment, if no cancellation having an order identification equal to the new cancellation's order identification is found by searching (1132) the cancellation queue (112), the processor (802) is programmed to place (1136) a copy of the new cancellation (104) in the cancellation queue (112) and send (1138) the new cancellation (104) to a market (803). However, in this kind of embodiment, if a cancellation (114) having an order identification equal to the new cancellation's order identification is found by searching (1132) the cancellation queue (112), the processor (802) is programmed to increment (1148) in the cancellation queue (112) the redundancy count of the found cancellation and to discard (1152) the new cancellation (104).

The embodiment shown in FIG. 11A further includes processor (802) programmed to receive (1140) an acknowledgement (1154) to a cancellation and to find (1142) in the cancellation queue (112) a queued cancellation corresponding to the received acknowledgement (1154). In this embodiment, if the found queued cancellation's redundancy count in the cancellation queue (112) is greater than zero, processor (802) is programmed to decrement (1146) the redundancy count of the queued cancellation (114) and to send (1138) an additional cancellation corresponding to the queued cancellation (114) to the market (803). However, in this kind of embodiment, if the found queued cancellation (114) has a redundancy count equal to zero, processor (802) is programmed to delete (1150) the queued cancellation (114) from the cancellation queue (112).

In a further embodiment shown in FIG. 11A, data storage device (826) is coupled to processor (802). In some embodiments, processor (802) is programmed to transmit (1144) a copy of each received the new cancellation (104) to storage device (826). In many embodiments, the entire cancellation queue (112) is periodically copied storage device (826). Generally, storage device (826) is used for recovery of the system (1131) in case of data loss. Storage device (826) is typically a hard drive, a tape drive, a floppy disk drive, an optical drive or any non-volatile storage medium.

In a further embodiment shown in FIG. 11A, communication ports (820, 822) are coupled to the processor (802). In this embodiment, the processor (802) is programmed to receive (1130) the new cancellation (104) from the client (801) through communication port (820). In the illustrated embodiment, communication port (820) interfaces with the communication network (805) to provide a means for data transmission to system (1131).

In a further embodiment of the invention shown in FIG. 11A, the processor (802) is programmed to send (1138) the new cancellation (104) to the market (803) through communication port (822). According to an even more specific embodiment of the invention, the processor (802) is further programmed to send (1138) an additional cancellation to the market (803) through communication port (822). In the illustrated embodiment, communication port (822) also interfaces with communication network (807) to provide a means for data transmission from system (1131).

Figure 12:
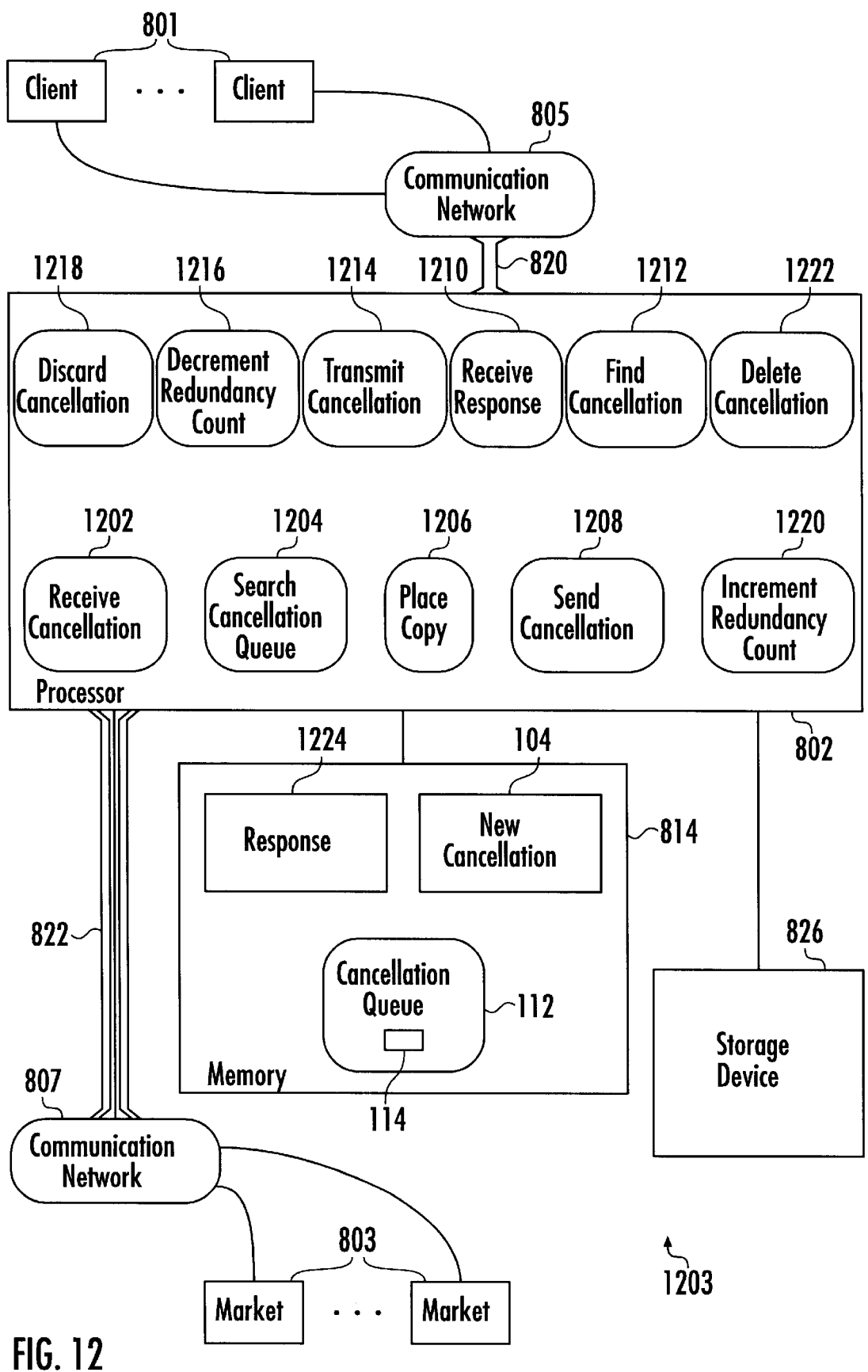
FIG. 12 illustrates an alternative embodiment of a system for canceling orders for securities.

Referring now to FIG. 12, an alternative embodiment of a system (1200) for canceling orders for securities in an automated securities trading broker-dealer system is seen implemented in hardware and software operating on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments the automated computing machinery comprises software stored in read only memory. In other embodiments, the automated computing machinery comprises software stored in programmable read only memory.

The embodiment in FIG. 12 shows system (1200) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system (803) in various embodiments, for example, are a mainframe, a minicomputer, a personal computer, a workstation, a laptop, or any such type of processing system. In the illustrated embodiment, system (1200) is coupled to multiple client systems (801) and multiple market systems (803). The market systems (803) are typically one or more financial exchanges, ECN's, broker-dealers, or market makers.

The illustrated embodiment in FIG. 12 further includes processor (802) programmed to receive (1202) a new cancellation (104) and to search (1204) the cancellation queue (112) for a cancellation (114) having an order identification equal to the new cancellation's order identification. According to the illustrated embodiment, if no cancellation having an order identification equal to the new cancellation's order identification is found by searching (1204) the cancellation queue (112), the processor (802) is further programmed to place (1206) a copy of the new cancellation (104) in the cancellation queue (112) and to send (1208) the new cancellation (104) to a market (803). However, in this kind of embodiment, if a cancellation (114) having an order identification equal to the new cancellation's order identification is found by searching (1204) the cancellation queue (112), the processor (802) is programmed to increment (1220) in the cancellation queue (112) the redundancy count of the found cancellation and discard (1218) the new cancellation (104).

The embodiment shown in FIG. 12 includes processor (802) programmed to receive (1210) a response (1224) to a cancellation and to find (1212) in the cancellation queue (112) a queued cancellation (114) corresponding to the received response (1224). In this embodiment, if the found queued cancellation's redundancy count is greater than zero, processor (802) is programmed to decrement (1216) the redundancy count of the queued cancellation (114) and to send (1208) an additional cancellation corresponding to the queued cancellation (114) to the market (803). However, in this kind of embodiment, if the found queued cancellation (114) has a redundancy count equal to zero, processor (802) is programmed to delete (1222) the queued cancellation (114) from the cancellation queue (112).

According to the illustrated embodiment, memory (814) is coupled to the processor (802). In this embodiment, the processor (802) is programmed to transmit (1214) the new cancellation (104) to the memory (814) for storage in the cancellation queue (112).

In a further embodiment shown in FIG. 12, data storage device (826) is coupled to the processor (802). In some embodiments, processor (802) is programmed to transmit (1214)a copy of each received new cancellation (104) to storage device (826). In many embodiments, the entire cancellation queue (112) is periodically copied to storage device (826). Generally, storage device (826) is used for recovery of the system (1200) in case of data loss. Storage device (826) is typically a hard drive, a tape drive, a floppy disk drive, an optical drive or any non-volatile storage medium.

In a further embodiment shown in FIG. 12, communication ports (820, 822) are coupled to the processor (802). In this embodiment, the processor (802) is programmed to receive (1202) the new cancellation (104) from the client (801) through communication port (820). In the illustrated embodiment, communication port (820) interfaces with the communication network (805) to provide a means for data transmission to system (1200).

In a further embodiment of the invention, the processor (802) is programmed to send (1208) the new cancellation (104) to the market (803) through communication port (822). According to an even more specific embodiment of the invention, the processor (802) is further programmed to send (1208) an additional cancellation to the market (803) through communication port (822). In the illustrated embodiment, communication port (822) also interfaces with communication network (807) to provide a means for data transmission from system (1200).

Figure 12A:
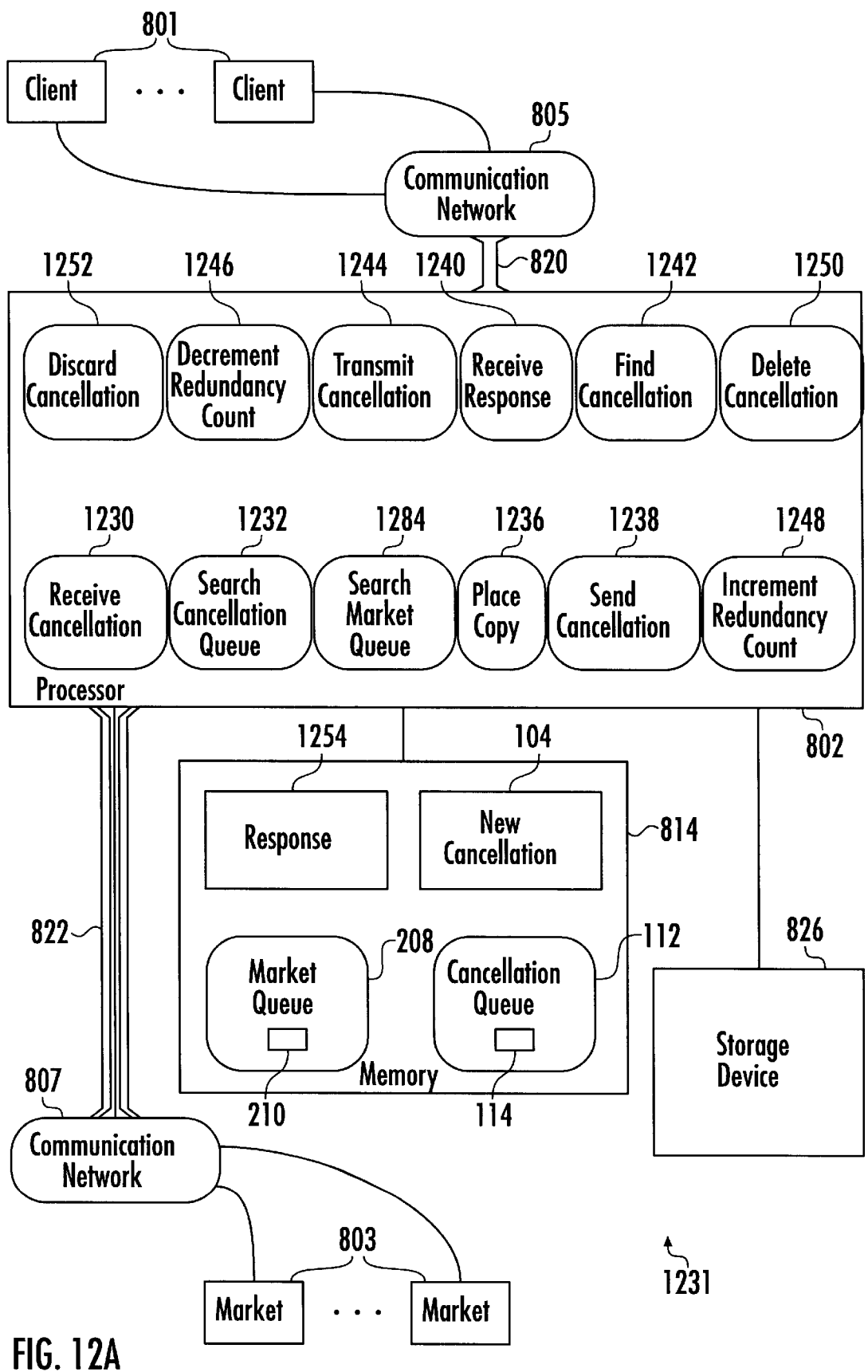
FIG. 12A illustrates an alternative embodiment of a system for canceling orders for securities wherein the orders are residing in a market queue waiting to be sent to the market.

Referring now to FIG. 12A, an alternative embodiment of a system (1231) for canceling orders for securities in an automated securities trading broker-dealer system is seen implemented in hardware and software operating on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments the automated computing machinery comprises software stored in read only memory. In other embodiments, the automated computing machinery comprises software stored in programmable read only memory.

The embodiment in FIG. 12A shows system (1231) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system (803) in various embodiments, for example, are a mainframe, a minicomputer, a personal computer, a workstation, a laptop, or any such type of processing system. In the illustrated embodiment, system (1231) is coupled to multiple client systems (801) and multiple market systems (803). The market systems (803) are typically one or more financial exchanges, ECN's, broker-dealers, or market makers.

The illustrated embodiment in FIG. 12A further includes processor (802) programmed to receive (1230) a new cancellation (104) and to search market queue (208) for an order (210) having an order identification equal to the new cancellation's order identification. In this embodiment, if an order (210) having the same order identification as the new cancellation (104) order identification is found in market queue (208), processor (802) is further programmed to search (1232) the cancellation queue (112) for a cancellation (114) having an order identification equal to the new cancellation's order identification. According to the illustrated embodiment, if no cancellation having an order identification equal to the new cancellation's order identification is found by searching (1232) the cancellation queue (112), the processor (802) is further programmed to place (1236) a copy of the new cancellation (104) in the cancellation queue (112) and send (1238) the new cancellation (104) to a market (803). However, in this kind of embodiment, if a cancellation (114) having an order identification equal to the new cancellation's order identification is found by searching (1232) the cancellation queue (112), the processor (802) is programmed to increment (1248) in the cancellation queue (112) the redundancy count of the found cancellation and to discard (1252) the new cancellation (104).

The embodiment shown in FIG. 12A further includes processor (802) programmed to receive (1240) a response (1254) to a cancellation and to find (1242) in the cancellation queue (112) a queued cancellation (114) corresponding to the received response (1254). In this embodiment, if the found queued cancellation's (114) redundancy count is greater than zero processor (802) is programmed to decrement (1246) the redundancy count of the queued cancellation (114) and to send (1238) an additional cancellation corresponding to the queued cancellation (114) to the market (803).

According to the illustrated embodiment, memory (814) is coupled to the processor (802). In this embodiment, the processor (802) is programmed to transmit (1244) the new cancellation (104) to the memory (814) for storage in the cancellation queue (112).

According to a more specific embodiment, the processor (802) is further programmed to delete (1250) the queued cancellation (114) from the cancellation queue (114) if the redundancy count of the queued cancellation (114) is equal to zero.

In a further embodiment shown in FIG. 12A, data storage device (826) is coupled to processor (802). In some embodiments, processor (802) is programmed to transmit (1244) a copy of each received (1230) new cancellation (104) to storage device (826). In many embodiments, the entire cancellation queue (112) is periodically copied to storage device (826). Generally, storage device (826) is used for recovery of the system (1200) in case of data loss. Storage device (826) is typically a hard drive, a tape drive, a floppy disk drive, an optical drive or any non-volatile storage medium.

In a further embodiment shown in FIG. 12A, communication ports (820, 822) are coupled to the processor (802). In this embodiment, the processor (802) is programmed to receive (1230) the new cancellation (104) from the client (801) through communication port (820). In the illustrated embodiment, communication port (820) interfaces with the communication network (805) to provide a means for data transmission to system (1231).

In a further embodiment of the invention shown in FIG. 12A, the processor (802) is programmed to send (1238) the new cancellation (104) to the market (803) through communication port (822). According to an even more specific embodiment of the invention, the processor (802) is further programmed to send (1238) an additional cancellation to the market (803) through communication port (822). In the illustrated embodiment, communication port (822) also interfaces with communication network (807) to provide a means for data transmission from system (1231).

Figure 13:
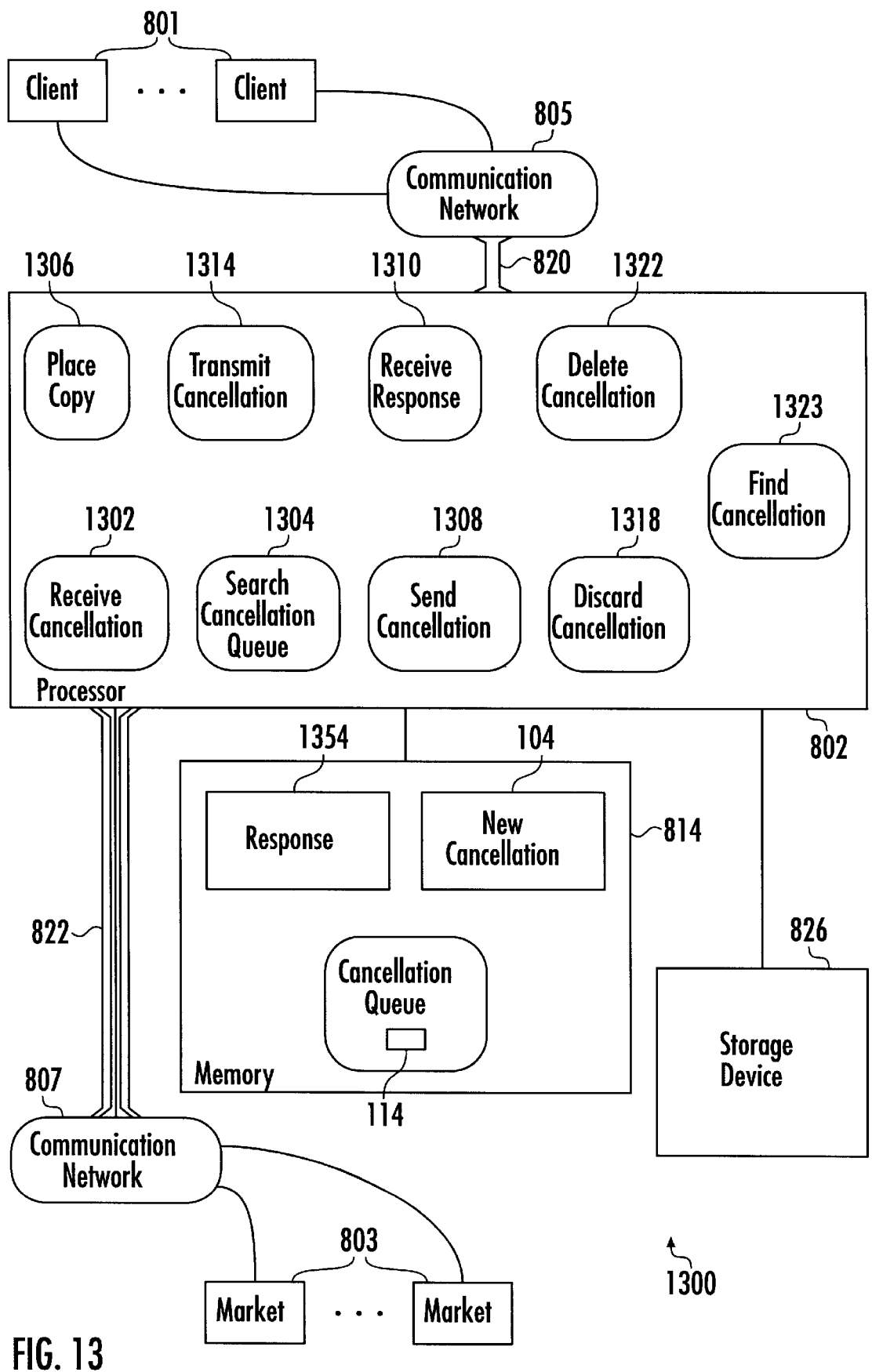
FIG. 13 illustrates an alternative embodiment of a system for canceling orders for securities.

Referring now to FIG. 13, an alternative embodiment of a system (1300) for canceling orders for securities in an automated securities trading broker-dealer system is seen implemented in hardware and software operating on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments the automated computing machinery comprises software stored in read only memory. In other embodiments, the automated computing machinery comprises software stored in programmable read only memory.

The embodiment in FIG. 13 shows system (1300) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system. (803) in various embodiments, for example, are a mainframe, a minicomputer, a personal computer, a workstation, a laptop, or any such type of processing system. In the illustrated embodiment, system (1300) is coupled to multiple client systems (801) and multiple market systems (803). The market systems (803) are typically one or more financial exchanges, ECN's, broker-dealers, or market makers.

The illustrated embodiment in FIG. 13 further includes processor (802) programmed to receive (1302) a new cancellation (104) and to search (1304) the cancellation queue (112) for a cancellation (114) having an order identification equal to the new cancellation's order identification. According to the illustrated embodiment, if no cancellation having an order identification equal to the new cancellation's order identification is found by searching (1304) the cancellation queue (112), the processor (802) is further programmed to place (1306) a copy of the new cancellation (104) in the cancellation queue (112) and send (1308) the new cancellation (104) to a market (803). However, in this kind of embodiment, if a cancellation (114) having an order identification equal to the new cancellation's order identification is found by searching (1304) the cancellation queue (112), the processor (802) is programmed to discard (1318) the new cancellation (104).

The embodiment shown in FIG. 13 further includes processor (802) programmed to receive (1310) a response (1324) to a cancellation and to find (1323) in the cancellation queue (112) a queued cancellation (114) corresponding to the received response. In this embodiment, if the response (1324) received is a rejection of the found queued cancellation (114), processor (802) is programmed to send (1308) an additional cancellation corresponding to the queued cancellation (114) to the market (803). However, in this kind of embodiment, if the response received is a notification that the found queued cancellation (114) was executed by the market (803), the queued cancellation (114) is deleted (1322) from the cancellation queue (112).

According to the illustrated embodiment, memory (814) is coupled to the processor (802). In this embodiment, the processor (802) is programmed to transmit (1314) the new cancellation (104) to the memory (814) for storage in the cancellation queue (112).

In a further embodiment shown in FIG. 13, data storage device (826) is coupled to processor (802). In some embodiments, processor (802) is programmed to transmit (1314) a copy of each received new cancellation (104) to storage device (826). In many embodiments, the entire cancellation queue (112) is periodically copied to storage device (826). Generally, storage device (826) is used for recovery of the system (1300) in case of data loss. Storage device (826) is typically a hard drive, a tape drive, a floppy disk drive, an optical drive or any non-volatile storage medium.

In a further embodiment shown in FIG. 13, communication ports (820, 822) are coupled to the processor (802). In this embodiment, the processor (802) is programmed to receive (1302) the new cancellation (104) from the client (801) through communication port (820). In the illustrated embodiment, communication port (820) interfaces with the communication network (805) to provide a means for data transmission to system (1300).

In a further embodiment of the invention, the processor (802) is programmed to send (1308) the new cancellation (104) to the market (803) through communication port (822). According to an even more specific embodiment of the invention, the processor (802) is further programmed to send (1308) an additional cancellation to the market (803) through communication port (822). In the illustrated embodiment, communication port (822) also interfaces with communication network (807) to provide a means for data transmission from system (1300).

Figure 13A:
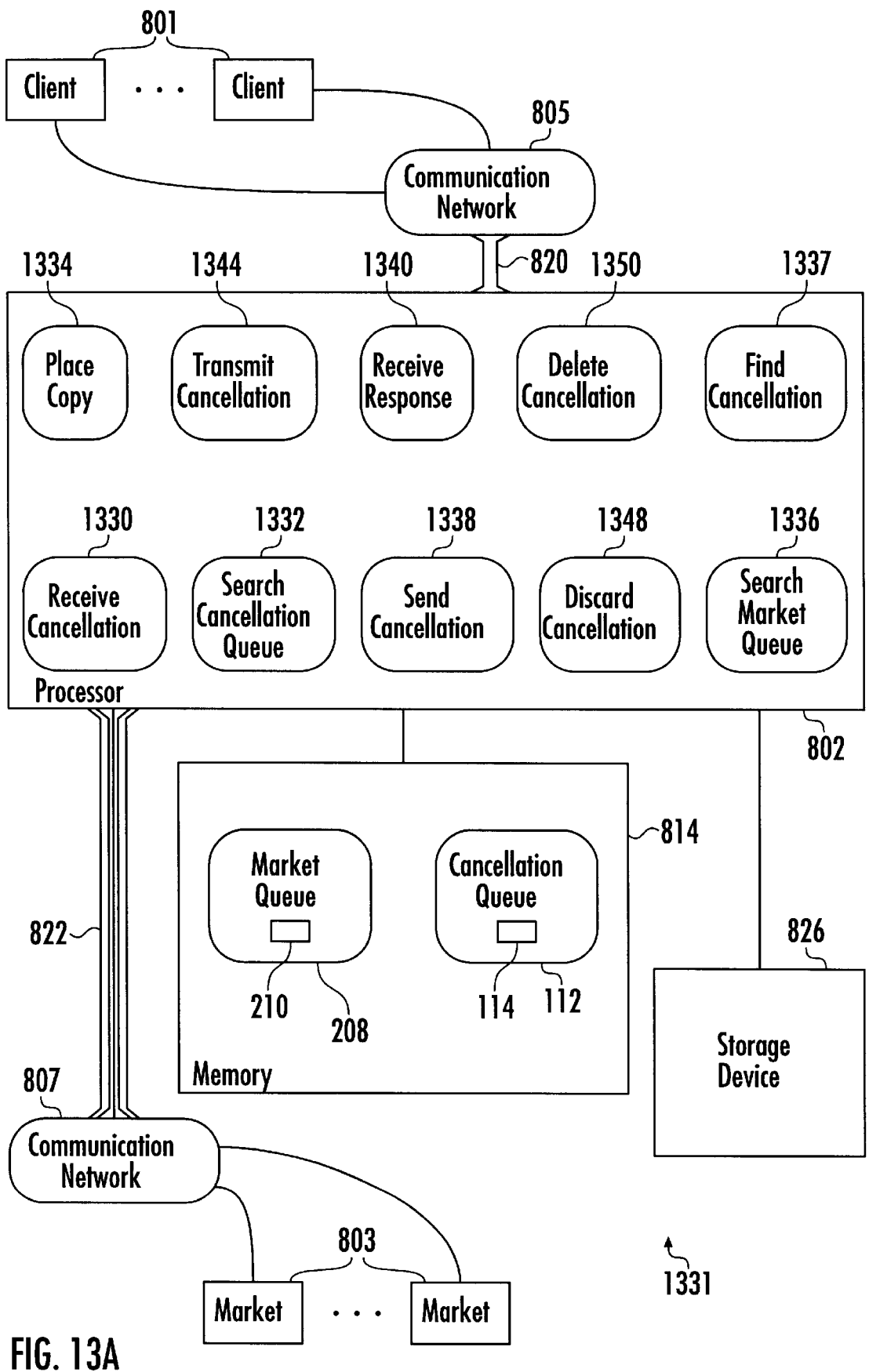
FIG. 13A illustrates an alternative embodiment of a system for canceling orders for securities wherein the orders are residing in a market queue waiting to be sent to the market.

Referring now to FIG. 13A, an alternative embodiment of a system (1331) for canceling orders for securities in an automated securities trading broker-dealer system is seen implemented in hardware and software operating on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments, the automated computing machinery comprises software stored in read only memory. In other embodiments, the automated computing machinery comprises software stored in programmable read only memory.

The embodiment in FIG. 13A shows system (1331) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system (803) in various embodiments, for example, are a mainframe, a minicomputer, a personal computer, a workstation, a laptop, or any such type of processing system. In the illustrated embodiment, system (1331) is coupled to multiple client systems (801) and multiple market systems (803). The market systems (803) are typically one or more financial exchanges, ECN's, broker-dealers, or market makers.

The illustrated embodiment in FIG. 13A further includes processor (802) programmed to receive (1330) a new cancellation (104) and to search (1334) market queue (208) for an order (210) having the same order identification as the new cancellation's order identification. In this embodiment, if an order (210) having the same order identification as the new cancellation's order identification is not found in market queue (208), processor (802) is further programmed to search (1332) the cancellation queue (112) for a cancellation (114) having an order identification equal to the new cancellation's order identification. According to the illustrated embodiment, if a cancellation having an order identification equal to the new cancellation's order identification is not found by searching (1332) the cancellation queue (112), the processor (802) is further programmed to place (1336) a copy of the new cancellation (104) in the cancellation queue (112) and send (1338) the new cancellation (104) to a market (803). However, in this kind of embodiment, if a cancellation (114) having an order identification equal to the new cancellation's order identification is found by searching (1332) the cancellation queue (112), the processor (802) is programmed to discard (1348) the new cancellation (104).

The embodiment shown in FIG. 13A further includes processor (802) programmed to receive (1340) a response (1354) to a cancellation and to find (1337) in the cancellation queue (112) a queued cancellation (114) corresponding to the received response (1354). In this embodiment, if the response (1354) received is a rejection of the found queued cancellation (114), processor (802) is further programmed to send (1338) an additional cancellation corresponding to the queued cancellation (114) to the market (803). However, in this kind of embodiment, if the response (1354) received is a notification that the found queued cancellation (114) was executed by the market (803), the queued cancellation (114) is deleted (1350) from the cancellation queue (112).

According to the illustrated embodiment, memory (814) is coupled to the processor (802). In this embodiment, the processor (802) is programmed to transmit (1344) the new cancellation (104) to the memory (814) for storage in the cancellation queue (112).

In a further embodiment shown in FIG. 13A, data storage device (826) is coupled to processor (802). In some embodiments, processor (802) is programmed to transmit (1344) a copy of each received new cancellation (104) to storage device (826). In many embodiments, the entire cancellation queue (112) is periodically copied to the storage device (826). Generally, storage device (826) is used for recovery of the system (1300) in case of data loss. Storage device (826) is typically a hard drive, a tape drive, a floppy disk drive, an optical drive or any non-volatile storage medium.

In a further embodiment shown in FIG. 13A, communication ports (820, 822) are coupled to the processor (802). In this embodiment, the processor (802) is programmed to receive (1330) the new cancellation (104) from the client (801) through communication port (820). In the illustrated embodiment, communication port (820) interfaces with the communication network (805) to provide a means for data transmission to system (1331).

In a further embodiment of the invention shown in FIG. 13A, the processor (802) is programmed to send (1338) the new cancellation (104) to the market (803) through communication port (822). According to an even more specific embodiment of the invention, the processor (802) is further programmed to send (1338) an additional cancellation to the market (803) through communication port (822). In the illustrated embodiment, communication port (822) also interfaces with communication network (807) to provide a means for data transmission from system (1331).

Figure 14:
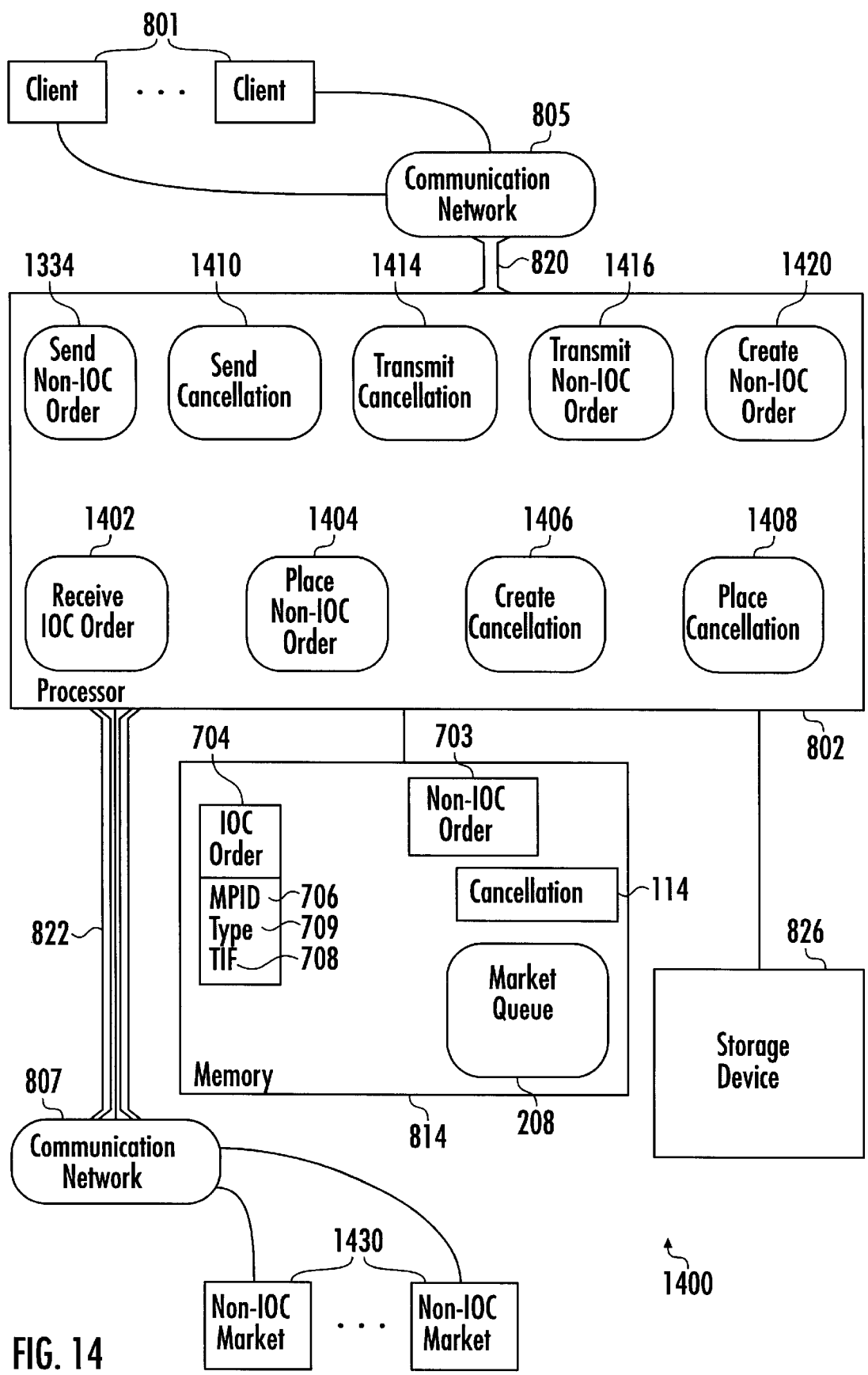
FIG. 14 illustrates a system for sending to the market an IOC order.

Referring now to FIG. 14, another aspect of the invention is seen, a system (1400) for emulating immediate or cancel (IOC) orders for securities in an automated securities trading broker-dealer system implemented in hardware and software operating on automated computing machinery (802, 814, 826). In some embodiments, for example, the automated computing machinery includes software stored in random access memory operating on a mainframe, a mini-computer, a personal computer, a workstation, a laptop, or any such type of processing system. In other embodiments, the automated computing machinery comprises programmable logic arrays. In other embodiments, the automated computing machinery comprises software stored in read only memory. In other embodiments, the automated computing machinery comprises software stored in programmable read only memory.

The illustrated embodiment in FIG. 14 shows system (1400) comprising a processor (802) coupled to a client system (801) and a market system (803) via communication networks (805, 807). Various embodiments effect data communications through a modem over a telephone line, LAN, WAN, Internet, and Intranet. All forms of data communications are well within the scope of this invention.

The client system (801) and the market system (803) in various embodiments, for example, are a mainframe, a minicomputer, a personal computer, a workstation, a laptop, or any such type of processing system. In the illustrated embodiment, system (1400) is coupled to multiple client systems (801) and multiple market systems (803). The market systems are typically one or more financial exchanges, ECN's, broker-dealers, or market makers.

The illustrated embodiment in FIG. 14 shows processor (802) programmed to receive (1402) IOC order (704). An IOC order (704) is typically executed immediately or cancelled. In some embodiments, "IOC" is encoded as TIF (708) equal to zero and in other embodiments "IOC" is encoded in a type code (709). In this embodiment, if MPID (706) in the IOC order (704) identifies a market that does not support IOC orders, processor (802) is programmed to create (1420) a non-IOC order (703) by setting the TIF (708) in IOC order (704) to the minimum value allowed in the non-IOC market (1430).

In the illustrated embodiment, processor (802) is programmed to place (1404) non-IOC order (703) in the market queue (208), to create (1406) a cancellation (114) for non-IOC order (703) and to place (1408) the cancellation (114) in the market queue (208) immediately behind the non-IOC order (703). Additionally, in this embodiment, the processor is programmed to send (1410) non-IOC order (703) and cancellation (114) to the non-IOC market (1430) so that the cancellation (114) arrives at the non-IOC market (1430) immediately after the non-IOC order (703). Because the non-IOC order (703) will be quickly canceled if it is not filled immediately upon arrival in the market, this embodiment effectively emulates an IOC order by use of a non-IOC order followed by a cancellation.

The illustrated embodiment in FIG. 14 also shows a memory (826) coupled to the processor (802). In this embodiment, the processor (802) is further programmed to transmit (1414) the IOC order (704) to the memory (826) and transmit (1416) the cancellation (114) to the memory (826).

In a further embodiment, shown in FIG. 14, system (1400) further comprises communication port (820) coupled to processor (802). In this embodiment, the processor is programmed to receive (1402) IOC order (704) from the client (801) through communication port (820).

According to a more specific embodiment, system (1400) further comprises a communication port (822) coupled to processor (802). In this embodiment, processor (802) is programmed to send (1410) the cancellation (114) to the market (803) through communication port (822). According to an even more specific embodiment, the processor (802) is programmed to send (1412) IOC order (704) to the market (803) through communication port (822).

In a further embodiment, shown in FIG. 14, system (1400) further comprises data storage device (826) coupled to processor (802). In some embodiments, processor (802) is programmed to transmit (1414) a copy of each received (1402) IOC order (704) and each created (1406) cancellation (114) to storage device (826). In many embodiments, the entire market queue (208) is periodically copied to storage device (826). Storage device (826) is typically used for recovery of system (1400) in case of data loss. Storage device (826) is typically a hard drive, a tape drive, a floppy disk drive, an optical drive or any non-volatile storage medium.

What is claimed is:

1. A method for canceling orders for securities in an automated securities trading environment, the method comprising the steps of:

receiving a new cancellation, the new cancellation comprising an instruction to cancel an order for securities, the cancellation further comprising an order identification;

searching a cancellation queue for a cancellation having an order identification equal to the new cancellation's order identification;

if no cancellation having an order identification equal to the new cancellation's order identification is found by searching the cancellation queue, placing a copy of the new cancellation in the cancellation queue and sending the new cancellation to a market;

if a cancellation having an order identification equal to the new cancellation's order identification is found by searching the cancellation queue, incrementing a redundancy count in the found cancellation and discarding the new cancellation; and periodically, for each queued cancellation having a redundancy count greater than zero, decrementing the redundancy count and sending an additional cancellation to the market.

2. The method of claim 1 wherein periodically decrementing the redundancy count for each queued cancellation having a redundancy count greater than zero further comprises periodically decrementing every three seconds the redundancy count for each queued cancellation having a redundancy count greater than zero.

3. The method of claim 1 further comprising, periodically deleting from the cancellation queue each queued cancellation having a redundancy count equal to zero.

4. A method for canceling an order for securities in an automated securities trading system wherein the order, residing in a market queue waiting to be sent to a market, has not yet been sent from the system to a market, the method comprising the steps of:

receiving a new cancellation, the new cancellation comprising an instruction to cancel an order for securities, the cancellation further comprising an order identification, the order having an order identification, the order's identification being the same as the new cancellation's order identification;

searching a cancellation queue for a cancellation having an order identification equal to the new cancellation's order identification, wherein, as a result of searching, no cancellation having an order identification equal to the new cancellation's order identification is found;

finding in a market queue the order;

recording on the new cancellation the time when the new cancellation was received;

placing a copy of the new cancellation in the cancellation queue; and canceling the order in the market queue.

5. The method of claim 4 wherein, as a result of searching, a cancellation having an order identification equal to the new cancellation's order identification is found, the method further comprising discarding the new cancellation.

6. The method of claim 4 further comprising periodically deleting queued cancellations dependent upon their ages.

7. A method for canceling orders for securities in an automated securities trading environment, the method comprising the steps of:

receiving a new cancellation, the new cancellation comprising an instruction to cancel an order for securities, the cancellation further comprising an order identification;

searching a market queue for an order having the same order identification as the new cancellation order identification, wherein the order is not found;

searching a cancellation queue for a cancellation having an order identification equal to the new cancellation's order identification;

if no cancellation having an order identification equal to the new cancellation's order identification is found by searching the cancellation queue, placing a copy of the new cancellation in the cancellation queue and sending the new cancellation to a market;

if a cancellation having an order identification equal to the new cancellation's order identification is found by searching the cancellation queue, incrementing a redundancy count in the found cancellation and discarding the new cancellation; and periodically, for each queued cancellation having a redundancy count greater than zero, decrementing the redundancy count and sending an additional cancellation to the market.

8. The method of claim 7 wherein periodically decrementing the redundancy count for each queued cancellation having a redundancy count greater than zero further comprises periodically decrementing every three seconds the redundancy count for each queued cancellation having a redundancy count greater than zero.

9. The method of claim 7 further comprising, periodically deleting from the cancellation queue each queued cancellation having a redundancy count equal to zero.

10. A method for canceling orders for securities in an automated securities trading environment, the method comprising the steps of:

receiving a new cancellation, the new cancellation comprising an instruction to cancel an order for securities, the cancellation further comprising an order identification;

searching a cancellation queue for a cancellation having an order identification equal to the new cancellation's order identification;

if no cancellation having an order identification equal to the new cancellation's order identification is found by searching the cancellation queue, placing a copy of the new cancellation in the cancellation queue and sending the new cancellation to a market;

if a cancellation having an order identification equal to the new cancellation's order identification is found by searching the cancellation queue, incrementing a redundancy count in the found cancellation and discarding the new cancellation;

receiving an acknowledgement to a cancellation having an order identification corresponding to a queued cancellation wherein the queued cancellation was previously sent to the market and the queued cancellation has a redundancy count greater than zero; and decrementing the redundancy count of the queued cancellation and sending an additional cancellation equivalent to the queued cancellation to the market.

11. The method of claim 10 wherein the redundancy count of the queued cancellation is equal to zero, the method further comprising deleting the queued cancellation from the cancellation queue.

12. A method for canceling orders for securities in an automated securities trading environment, wherein, when the new cancellation is received, the order has already been sent from the system to a market, the method comprising the steps of:

receiving a new cancellation, the new cancellation comprising an instruction to cancel an order for securities, the cancellation further comprising an order identification, the order identification being the same as the cancellation's order identification, wherein, when the new cancellation is received, the order has already been sent from the system to a market;

searching a market queue for an order having the same order identification as the new cancellation order identification, wherein the order is not found;

searching a cancellation queue for a cancellation having an order identification equal to the new cancellation's order identification;

if no cancellation having an order identification equal to the new cancellation's order identification is found by searching the cancellation queue, placing a copy of the new cancellation in the cancellation queue and sending the new cancellation to a market;

if a cancellation having an order identification equal to the new cancellation's order identification is found by searching the cancellation queue, incrementing a redundancy count in the found cancellation and discarding the new cancellation;

receiving an acknowledgement to a cancellation having an order identification corresponding to a queued cancellation wherein the queued cancellation was previously sent to the market and the queued cancellation has a redundancy count greater than zero; and decrementing the redundancy count of the queued cancellation and sending an additional cancellation equivalent to the queued cancellation to the market.

13. The method of claim 12 wherein the redundancy count of the queued cancellation is equal to zero, the method further comprising deleting the queued cancellation from the cancellation queue.

14. A method for canceling orders for securities in an automated securities trading environment, the method comprising the steps of:

receiving a new cancellation, the new cancellation comprising an instruction to cancel an order for securities, the cancellation further comprising an order identification;

searching a cancellation queue for a cancellation having an order identification equal to the new cancellation's order identification;

if no cancellation having an order identification equal to the new cancellation's order identification is found by searching the cancellation queue, placing a copy of the new cancellation in the cancellation queue and sending the new cancellation to a market;

if a cancellation having an order identification equal to the new cancellation's order identification is found by searching the cancellation queue, incrementing a redundancy count in the found cancellation and discarding the new cancellation; and receiving a response to a cancellation having an order identification corresponding to a queued cancellation wherein the queued cancellation was previously sent to the market and the queued cancellation has a redundancy count greater than zero; and decrementing the redundancy count of the queued cancellation and sending an additional cancellation equivalent to queued cancellation to the market.

15. The method of claim 14 wherein the redundancy count of the queued cancellation equals to zero, the method further comprising deleting the queued cancellation from the cancellation queue.

16. A method for canceling orders for securities in an automated securities trading environment, wherein, when the new cancellation is received, the order has already been sent from the system to a market, the method comprising the steps of:

receiving a new cancellation, the new cancellation comprising an instruction to cancel an order for securities, the cancellation further comprising an order identification, the order identification being the same as the cancellation's order identification, wherein, when the new cancellation is received, the order has already been sent from the system to a market;

searching a market queue for an order having the same order identification as the new cancellation's order identification, wherein the order is not found;

if no cancellation having an order identification equal to the new cancellation's order identification is found by searching the cancellation queue, placing a copy of the new cancellation in the cancellation queue and sending the new cancellation to a market;

if a cancellation having an order identification equal to the new cancellation's order identification is found by searching the cancellation queue, incrementing a redundancy count in the found cancellation and discarding the new cancellation; and receiving a response to a cancellation having an order identification corresponding to a queued cancellation wherein the queued cancellation was previously sent to the market and the redundancy count of the queued cancellation is greater than zero; and decrementing the redundancy count of the queued cancellation and sending an additional cancellation equivalent to the queued cancellation to the market.

17. The method of claim 16, wherein the redundancy count of the queued cancellation is equal zero, the method further comprising deleting the queued cancellation from the cancellation queue.

18. A method for canceling orders for securities in an automated securities trading environment, the method comprising the steps of:

receiving a new cancellation, the new cancellation comprising an instruction to cancel an order for securities, the cancellation further comprising an order identification;

searching a cancellation queue for a cancellation having an order identification equal to the new cancellation's order identification;

if no cancellation having an order identification equal to the new cancellation's order identification is found by searching the cancellation queue, placing a copy of the new cancellation in the cancellation queue and sending the new cancellation to a market;

if a cancellation having an order identification equal to the new cancellation's order identification is found by searching the cancellation queue, discarding the new cancellation;

receiving a response to a cancellation having an order identification corresponding to a queued cancellation wherein the queued cancellation was previously sent to the market and wherein the response comprises a rejection of the queued cancellation; and sending an additional cancellation equivalent to the queued cancellation to the market.

19. The method of claim 18 wherein the response comprises a notification that the queued cancellation was executed by the market, the method further comprising deleting the queued cancellation from the cancellation queue.

20. A method for canceling orders for securities in an automated securities trading environment, wherein, when the new cancellation is received, the order has already been sent from the system to a market, the method comprising the steps of:

receiving a new cancellation, the new cancellation comprising an instruction to cancel an order for securities, the cancellation further comprising an order identification, the order identification being the same as the cancellation's order identification, wherein, when the new cancellation is received, the order has already been sent from the system to a market;

searching a market queue for an order having the same order identification as the new cancellation order identification, wherein the order is not found;

searching a cancellation queue for a cancellation having an order identification equal to the new cancellation's order identification;

if a cancellation having an order identification equal to the new cancellation's order identification is not found by searching the cancellation queue, placing a copy of the new cancellation in the cancellation queue and sending the new cancellation to a market;

if a cancellation having an order identification equal to the new cancellation's order identification is found by searching the cancellation queue, discarding the new cancellation; and receiving a response to a cancellation having an order identification corresponding to a queued cancellation wherein the queued cancellation was previously sent to the market and wherein the response comprises a rejection of the queued cancellation; and sending an additional cancellation corresponding to the queued cancellation to the market.

21. The method of claim 20 wherein the response comprises a notification that the queued cancellation was executed by the market, the method further comprising deleting the queued cancellation from the cancellation queue.

22. A method for emulating immediate or cancel (IOC) orders for securities in an automated securities trading environment, the method comprising the steps of:

receiving an IOC order, the IOC order comprising an instruction to send an order immediately followed by a cancellation, the IOC order further comprising an order identification, the market identification identifying a market that does not support IOC orders as such;

placing the IOC order in a market queue;

creating a cancellation for the received IOC order;

placing in the market queue immediately behind the IOC order, the cancellation;

sending the IOC order to the market; and sending the cancellation to the market.

23. A system, implemented in software and hardware on a digital computer, for canceling orders for securities in an automated securities trading environment, the system comprising:

a processor coupled to at least one client system and at least one market system, the processor programmed to:
receive a new cancellation, the new cancellation comprising an instruction to cancel an order for securities, the cancellation further comprising an order identification;
search a cancellation queue for a cancellation having an order identification equal to the new cancellation's order identification;
if no cancellation having an order identification equal to the new cancellation's order identification is found by searching the cancellation queue, place a copy of the new cancellation in the cancellation queue and send the new cancellation to a market;
if a cancellation having an order identification equal to the new cancellation's order identification is found by searching the cancellation queue, increment a redundancy count in the found cancellation and discard the new cancellation; and
periodically, for each queued cancellation having a redundancy count greater than zero, decrement the redundancy count and send an additional cancellation to the market; and a memory coupled to the processor, the processor programmed to transmit the new cancellation to the memory.

24. The system of claim 23 wherein the processor is further programmed to periodically decrement the redundancy count every three seconds for each queued cancellation having a redundancy count greater than zero.

25. The system of claim 23 wherein the processor is further programmed to periodically delete from the cancellation queue cancellations having a redundancy count equal to zero.

26. The system of claim 23 further comprising a first communication port coupled to the processor, wherein the processor is further programmed to receive the new cancellation from the client through the first communication port.

27. The system of claim 23 further comprising a second communication port coupled to the processor, wherein the processor is further programmed to send the new cancellation to the market through the second communication port.

28. The system of claim 27 wherein the processor is further programmed to send the additional cancellation to the market through the second communication port.

29. The system of claim 23 further comprising a data storage device coupled to the processor, wherein the processor is further programmed to transmit cancellations to the storage device.

30. A system, implemented in software and hardware on a digital computer, for canceling an order for securities in an automated securities trading environment system wherein the order, residing in a market queue waiting to be sent to a market, has not yet been sent from the system to a market, the system comprising:

a processor coupled to at least one client system and at least one market system, the processor programmed to:
receive a new cancellation, the new cancellation comprising an instruction to cancel an order for securities, the cancellation further comprising an order identification, the order having an order identification, the order's identification being the same as the new cancellation's order identification;
search a cancellation queue for a cancellation having an order identification equal to the new cancellation's order identification, wherein, as a result of searching, no cancellation having an order identification equal to the new cancellation's order identification is found;
find in a market queue the order;
place a copy of the new cancellation in the cancellation queue;
record on the new cancellation the time when the new cancellation was received; and
cancel the order in the market queue; and a memory coupled to the processor, the processor programmed to transmit the new cancellation to the memory.

31. The system of claim 30 wherein, if a cancellation having an order identification equal to the new cancellation's order identification is found by searching the cancellation queue, the processor is further programmed to discard the new cancellation.

32. The system of claim 30 wherein the processor is further programmed to periodically delete cancellations from the cancellation queue dependent upon their ages.

33. The system of claim 30 further comprising a communication port coupled the processor, the processor programmed to receive the new cancellation from the client through the communication port.

34. The system of claim 30 further comprising a data storage device coupled to the processor, the processor programmed to transmit cancellations to the storage device.

35. A system, implemented in software and hardware on a digital computer, for canceling orders for securities in an automated securities trading environment, the system comprising:
- a processor coupled to at least one client system and at least one market system, the processor programmed to:
  - receive a new cancellation, the new cancellation comprising an instruction to cancel an order for securities, the cancellation further comprising an order identification;
  - search a market queue for an order having the same order identification as the new cancellation order identification, wherein the order is not found;
  - search a cancellation queue for a cancellation having an order identification equal to the new cancellation's order identification;
  - if no cancellation having an order identification equal to the new cancellation's order identification is found by searching the cancellation queue, place a copy of the new cancellation in the cancellation queue and sending the new cancellation to a market;
  - if a cancellation having an order identification equal to the new cancellation's order identification is found by searching the cancellation queue, increment a redundancy count in the found cancellation and discard the new cancellation; and
  - periodically, for each queued cancellation having a redundancy count greater than zero, decrement the redundancy count and send an additional cancellation to the market; and
- a memory coupled to the processor, the processor programmed to transmit the new cancellation to the memory.

36. The system of claim 35 wherein the processor is further programmed to periodically decrement the redundancy count every three seconds for each queued cancellation having a redundancy count greater than zero.

37. The system of claim 35 wherein the processor is further programmed to periodically delete from the cancellation queue cancellations having a redundancy count equal to zero.

38. The system of claim 35 further comprising a first communication port coupled to the processor, wherein the processor is further programmed to receive the new cancellation from the client through the first communication port.

39. The system of claim 35 further comprising a second communication port coupled to the processor, wherein the processor is further programmed to send the new cancellation to the market through the second communication port.

40. The system of claim 39 further comprising the processor programmed to send the additional cancellation to the market through the second communication port.

41. The system of claim 35, further comprising a data storage device coupled to the processor, wherein the processor is further programmed to transmit cancellations to the storage device.

42. A system, implemented in software and hardware on a digital computer, for canceling orders for securities in an automated securities trading environment, the system comprising:
- a processor coupled to at least one client system and at least one market system, the processor programmed to:
  - receive a new cancellation, the new cancellation comprising an instruction to cancel an order for securities, the cancellation further comprising an order identification;
  - search a cancellation queue for a cancellation having an order identification equal to the new cancellation's order identification;
  - if no cancellation having an order identification equal to the new cancellation's order identification is found by searching the cancellation queue, place a copy of the new cancellation in the cancellation queue and send the new cancellation to a market;
  - if a cancellation having an order identification equal to the new cancellation's order identification is found by searching the cancellation queue, increment a redundancy count in the found cancellation and discard the new cancellation;
  - receive an acknowledgement to a cancellation having an order identification corresponding to a queued cancellation wherein the queued cancellation was previously sent to the market and wherein the queued cancellation redundancy count is greater than zero; and
  - decrement the redundancy count of the queued cancellation and send an additional cancellation corresponding to the queued cancellation to the market; and
- a memory coupled to the processor, the processor programmed to transmit the new cancellation to the memory.

43. The system of claim 42 wherein the processor is programmed to delete from the cancellation queue the queued cancellation if the redundancy count of the queued cancellation is equal to zero.

44. The system of claim 42 further comprising a first communication port coupled to the processor, wherein the processor is further programmed to receive the new cancellation from the client through the first communication port.

45. The system of claim 42 further comprising a second communication port coupled to the processor, wherein the processor is further programmed to send the new cancellation to the market through the second communication port.

46. The system of claim 45 wherein the processor is programmed to send the additional to the market through the second communication port.

47. The system of claim 42 further comprising a data storage device coupled to the processor, wherein the processor is further programmed to transmit the cancellations to the storage device.

48. A system, implemented in software and hardware and hardware on a digital computer, for canceling an order for securities in an automated securities trading environment system wherein the order, residing in a market queue waiting to be sent to a market, has not yet been sent from the system to a market, the system comprising:
- a processor coupled to at least one client system and at least one market system, the processor programmed to:
  - receive a new cancellation, the new cancellation comprising an instruction to cancel an order for securities, the cancellation further comprising an order identification, the order identification being the same as the cancellation's order identification, wherein, when the new cancellation is received, the order has already been sent from the system to a market;
  - search a market queue for an order having the same order identification as the new cancellation order identification, wherein the order is not found;
  - search a cancellation queue for a cancellation having an order identification equal to the new cancellation's order identification;

if no cancellation having an order identification equal to the new cancellation's order identification is found by searching the cancellation queue, place a copy of the new cancellation in the cancellation queue and send the new cancellation to a market;

if a cancellation having an order identification equal to the new cancellation's order identification is found by searching the cancellation queue, increment a redundancy count in the found cancellation and discard the new cancellation; and receive a response to a cancellation having an order identification corresponding to a queued cancellation wherein the queued cancellation was previously sent to the market and wherein the queued cancellation redundancy count is greater than zero; and decrement the redundancy count of the queued cancellation and send an additional cancellation corresponding to the queued cancellation to the market; and a memory coupled to the processor, the processor programmed to transmit the new cancellation to the memory.

49. The system of claim 48 wherein the processor is further programmed to delete the queued cancellation from the cancellation queue if the redundancy count of the queued cancellation is equal to zero.

50. The system of claim 48 further comprising a first communication port coupled to the processor, the processor programmed to receive the new cancellation from the client through the first communication port.

51. The system of claim 48 further comprising a second communication port coupled to the processor, wherein the processor is further programmed to send the new cancellation to the market through the second communication port.

52. The system of claim 51 wherein the processor is programmed to send the additional cancellation to the market through the second communication port.

53. The system of claim 48, further comprising a data storage device coupled to the processor, wherein the processor is further programmed to transmit the cancellations to the storage device.

54. A system, implemented in software and hardware on a digital computer, for canceling orders for securities in an automated securities trading environment, the system comprising:

a processor coupled to at least one client system and at least one market system, the processor programmed to:

receive a new cancellation, the new cancellation comprising an instruction to cancel an order for securities, the cancellation further comprising an order identification;

search a cancellation queue for a cancellation having an order identification equal to the new cancellation's order identification;

if no cancellation having an order identification equal to the new cancellation's order identification is found by searching the cancellation queue, place a copy of the new cancellation in the cancellation queue and send the new cancellation to a market;

if a cancellation having an order identification equal to the new cancellation's order identification is found by searching the cancellation queue, increment a redundancy count in the found cancellation and discard the new cancellation; and receive a response to a cancellation having an order identification corresponding to a queued cancellation wherein the queued cancellation was previously sent to the market and wherein the redundancy count of the queued cancellation is greater than zero; and decrement the redundancy count of the queued cancellation and send an additional cancellation equivalent to the queued cancellation to the market; and a memory coupled to the processor, the processor programmed to transmit the new cancellation to the memory.

55. The system of claim 54, wherein the processor is further programmed to delete the queued cancellation from the cancellation queue if the redundancy count of the queued cancellation is equal to zero.

56. The system of claim 54 further comprising a first communication port coupled to the processor, wherein the processor is further programmed to receive the new cancellation from the client through the first communication port.

57. The system of claim 54 further comprising a second communication port coupled to the processor, wherein the processor is further programmed to send the new cancellation to the market through the second communication port.

58. The system of claim 57 wherein the processor is programmed to send the additional cancellation to the market through the second communication port.

59. The system of claim 54 further comprising a data storage device coupled to the processor, wherein the processor is programmed to transmit the cancellations to the storage device.

60. A system, implemented in software and hardware on a digital computer, for canceling an order for securities in an automated securities trading environment system wherein the order, residing in a market queue waiting to be sent to a market, has not yet been sent from the system to a market, the system comprising:

a processor coupled to at least one client system and at least one market system, the processor programmed to:

receive a new cancellation, the new cancellation comprising an instruction to cancel an order for securities, the cancellation further comprising an order identification, the order identification being the same as the cancellation's order identification, wherein, when the new cancellation is received, the order has already been sent from the system to a market;

search a market queue for an order having the same order identification as the new cancellation order identification, wherein the order is not found;

if no cancellation having an order identification equal to the new cancellation's order identification is found by searching the cancellation queue, place a copy of the new cancellation in the cancellation queue and send the new cancellation to a market;

if a cancellation having an order identification equal to the new cancellation's order identification is found by searching the cancellation queue, increment a redundancy count in the found cancellation and discard the new cancellation;

receive a response to a cancellation having an order identification corresponding to a queued cancellation wherein the queued cancellation was previously sent to the market and wherein the redundancy count of the queued cancellation is greater than zero; and decrement the redundancy count of the queued cancellation and send an additional cancellation corresponding to the queued cancellation to the market; and a memory coupled to the processor, the processor programmed to transmit the new cancellation to the memory.

61. The system of claim 60 wherein the processor is further programmed to delete the queued cancellation from the cancellation queue if the redundancy count of the queued cancellation is equal to zero.

62. The system of claim 60 further comprising a first communication port coupled to the processor, wherein the processor is further programmed to receive the new cancellation from the client through the first communication port.

63. The system of claim 60 further comprising a second communication port coupled to the processor, wherein the processor is programmed to send the new cancellation the market through the second communication port.

64. The system of claim 63 wherein the processor is programmed to send the additional cancellation to the market through the second communication port.

65. The system of claim 60 further comprising a data storage device coupled to the processor, wherein the processor is programmed to transmit the cancellations to the storage device.

66. A system, implemented in software and hardware on a digital computer, for canceling orders for securities in an automated securities trading environment, the system comprising:
   a processor coupled to at least one client system and at least one market system, the processor programmed to:
      receive a new cancellation, the new cancellation comprising an instruction to cancel an order for securities, the cancellation further comprising an order identification;
      search a cancellation queue for a cancellation having an order identification equal to the new cancellation's order identification;
      if no cancellation having an order identification equal to the new cancellation's order identification is found by searching the cancellation queue, place a copy of the new cancellation in the cancellation queue and send the new cancellation to a market;
      if a cancellation having an order identification equal to the new cancellation's order identification is found by searching the cancellation queue, discard the new cancellation;
      receive a response to a cancellation having an order identification corresponding to a queued cancellation wherein the queued cancellation was previously sent to the market and wherein the response comprises a rejection of the queued cancellation; and
      send an additional cancellation equivalent to the queued cancellation to the market; and
   a memory coupled to the processor, the processor programmed to transmit the new cancellation to the memory.

67. The system of claim 66 wherein the processor is further programmed to delete the queued cancellation from the cancellation queue if the response of the queued cancellation is a notification that the queued cancellation was executed by the market.

68. The system of claim 66 further comprising a first communication port coupled to the processor, the processor programmed to receive the new cancellation from the client through the first communication port.

69. The system of claim 66 further comprising a second communication port coupled to the processor, the processor programmed to send the new cancellation to the market through the second communication port.

70. The system of claim 69 wherein the processor is further programmed to send the additional cancellation to the market through the second communication port.

71. The system of claim 66 further comprising a data storage device coupled to the processor, wherein the processor is further programmed to transmit the cancellations to the storage device.

72. A system, implemented in software and hardware on a digital computer, for canceling an order for securities in an automated securities trading environment system wherein the order, residing in a market queue waiting to be sent to a market, has not yet been sent from the system to a market, the system comprising:
   a processor coupled to at least one client system and at least one market system, the processor programmed to:
      receive a new cancellation, the new cancellation comprising an instruction to cancel an order for securities, the cancellation further comprising an order identification, the order identification being the same as the cancellation's order identification, wherein, when the new cancellation is received, the order has already been sent from the system to a market;
      search a market queue for an order having the same order identification as the new cancellation order identification, wherein the order is not found;
      search a cancellation queue for a cancellation having an order identification equal to the new cancellation's order identification;
      if no cancellation having an order identification equal to the new cancellation's order identification is found by searching the cancellation queue, place a copy of the new cancellation in the cancellation queue and send the new cancellation to a market;
      if a cancellation having an order identification equal to the new cancellation's order identification is found by searching the cancellation queue, discard the new cancellation;
      receive a response to a cancellation having an order identification corresponding to a queued cancellation wherein the queued cancellation was previously sent to the market and wherein the response comprises a rejection of the queued cancellation; and
      send an additional cancellation equivalent to the queued cancellation to the market; and
   a memory coupled to the processor, the processor programmed to transmit the new cancellation to the memory.

73. The system of claim 72 wherein the processor is further programmed to delete the queued cancellation from the cancellation queue if the response is a notification that the queued cancellation was executed by the market.

74. The system of claim 72 further comprising a first communication port coupled to the processor, wherein the processor is programmed to receive the new cancellation from the client through the first communication port.

75. The system of claim 72 further comprising a second communication port coupled to the processor, the processor programmed to send the new cancellation to the market through the second communication port.

76. The system of claim 75 wherein the processor is programmed to send the additional cancellation to the market through the second communication port.

77. The system of claim 72 further comprising a data storage device coupled to the processor, the processor programmed to transmit the cancellations to the storage device.

78. A system, implemented in software and hardware on a digital computer, for emulating immediate or cancel (IOC) orders for securities in an automated securities trading environment, the system comprising:

a processor coupled to at least one client system and at least on market system, the processor programmed to:
  receive an IOC order, the IOC order comprising an instruction to send an order immediately followed by a cancellation, the IOC order further comprising an order identification, the market-identification identifying a market that does not support IOC orders as such;
  place the IOC order in a market queue;
  create a cancellation for the IOC order;
  place in the market queue immediately behind the IOC order, the cancellation;
  send the IOC order to the market;
  send the cancellation to the market; and
a memory coupled to the processor, the processor programmed to:
  transmit the IOC order to the memory; and
  transmit the cancellation to the memory.

79. The system of claim 78, further comprising a first communication port coupled to the processor, wherein the processor is further programmed to receive the IOC order from the client through the first communication port.

80. The system of claim 78 further comprising a second communication port coupled to the processor, wherein the processor is further programmed to send the cancellation to the market through the second communication port.

81. The system of claim 80 wherein the processor is further programmed to send the IOC order to the market through the second communication port.

82. The system of claim 78, further comprising a storage device coupled to the processor, the processor programmed to:
  transmit the IOC order to the storage device; and
  transmit the cancellation to the storage device.

* * * * *